(12) United States Patent
Kashiwagi et al.

(10) Patent No.: US 12,391,554 B2
(45) Date of Patent: Aug. 19, 2025

(54) SURFACE-MODIFIED NANODIAMOND, NANODIAMOND DISPERSION COMPOSITION, AND METHOD FOR MANUFACTURING SURFACE-MODIFIED NANOCARBON PARTICLES

(71) Applicant: DAICEL CORPORATION, Osaka (JP)

(72) Inventors: Takeru Kashiwagi, Tokyo (JP); Hiroshi Koyama, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 846 days.

(21) Appl. No.: 17/625,546

(22) PCT Filed: Jun. 30, 2020

(86) PCT No.: PCT/JP2020/025693
§ 371 (c)(1),
(2) Date: Jan. 7, 2022

(87) PCT Pub. No.: WO2021/006120
PCT Pub. Date: Jan. 14, 2021

(65) Prior Publication Data
US 2022/0289577 A1 Sep. 15, 2022

(30) Foreign Application Priority Data

Jul. 9, 2019 (JP) .................................. 2019-127636

(51) Int. Cl.
*C01B 32/28* (2017.01)
*B82Y 30/00* (2011.01)
*B82Y 40/00* (2011.01)

(52) U.S. Cl.
CPC .............. *C01B 32/28* (2017.08); *B82Y 30/00* (2013.01); *B82Y 40/00* (2013.01); *C01P 2002/82* (2013.01); *C01P 2004/64* (2013.01)

(58) Field of Classification Search
None
See application file for complete search history.

(56) References Cited

U.S. PATENT DOCUMENTS

2015/0021528 A1* 1/2015 Chartoff ................... C08K 9/04
556/136

FOREIGN PATENT DOCUMENTS

| JP | 2008-303104 A | 12/2008 |
| JP | 2010-202458 A | 9/2010 |

OTHER PUBLICATIONS

Zhang, X., et al. PEGylation and polyPEGylation of nanodiamond. Polymer 53 (2012) 3175-3184. (Year: 2012).*

(Continued)

*Primary Examiner* — Anthony J Zimmer
*Assistant Examiner* — Zachary John Baum
(74) *Attorney, Agent, or Firm* — Birch, Stewart, Kolasch & Birch, LLP

(57) ABSTRACT

Provided is a surface-modified nanodiamond having excellent dispersibility in an organic solvent, or a surface-modified nanodiamond which is an intermediate for obtaining the surface-modified nanodiamond. Also, provided is a method of producing surface-modified nanocarbon particles, in which various surface-modifying groups can be introduced into the nanocarbon particles. The surface-modified nanodiamond according to the present disclosure includes a nanodiamond particle and a group that surface-modifies the nanodiamond particle, the group being represented by Formula (1) or (2).

(Continued)

(56) References Cited

OTHER PUBLICATIONS

English translation of JP-2008303104-A Description (Year: 2008).*
English translation of JP-2010202458-A Description (Year: 2010).*
Extended European Search Report for European Application No. 20836633.6, dated Nov. 8, 2023.
International Preliminary Report on Patentability and Written Opinion of the International Searching Authority for International Application No. PCT/JP2020/025693, dated Jan. 11, 2022, with English translation.
International Search Report for International Application No. PCT/JP2020/025693, dated Sep. 15, 2020, with an English translation.
Zhang et al., "PEGylation and polyPEGyiation of nanodiamond", Polymer, vol. 53, No. 15, Jul. 6, 2012, pp. 3178-3184.
Zhang et al., "PolyPEGylated nanodiamond for intracellular delivery of a chemotherapeutic drug", Polymer Chemistry, vol. 3, 2012, pp. 2716-2719.
Chinese Office Action and Search Report for Chinese Application No. 202080049896.6, dated Dec. 21, 2023.

* cited by examiner

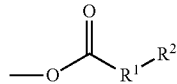

(1)

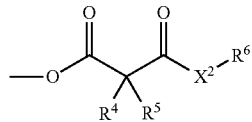

(2)

18 Claims, 3 Drawing Sheets

SURFACE-MODIFIED NANODIAMOND, NANODIAMOND DISPERSION COMPOSITION, AND METHOD FOR MANUFACTURING SURFACE-MODIFIED NANOCARBON PARTICLES

TECHNICAL FIELD

The present disclosure relates to a surface-modified nanodiamond, a nanodiamond dispersion composition, and a method of producing surface-modified nanocarbon particles. The present application claims priority from the Japanese Patent Application No. 2019-127636, filed in Japan on Jul. 9, 2019, the contents of which are incorporated herein by reference.

BACKGROUND ART

Nano-sized fine substances such as nanocarbon particles are known to have novel characteristics that cannot be achieved in a bulk state. For example, nanodiamond particles (i.e., nano-sized diamond particles) exhibit mechanical strength, a high refractive index, thermal conductivity, insulating properties, antioxidation properties, and an action of promoting the crystallization of resins, and the like. However, nanodiamond particles typically have large proportions of surface atoms, a sum of van der Waals forces that can act between surface atoms of adjacent particles is strong, and aggregation tends to occur. In addition, in the case of nanodiamond particles, Coulomb interaction between crystalline surfaces of adjacent crystals may contribute to agglutination, which is a phenomenon where particles form a significantly firm cluster. Thus, it was extremely difficult to disperse nanodiamond particles to be in a state of primary particles in an organic solvent or in a resin. Therefore, the surface of nanodiamond particles is modified so as to impart dispersibility to the nanodiamond particles to suppress aggregation.

As the nanodiamond having a modified surface, for example, a surface-modified nanodiamond obtained by introducing a tertiary brominated alkyl group into a hydroxy group on the surface of nanodiamond particles and subjecting the hydroxy group to a reaction with polyethylene glycol methacrylate (PEGMA) is known (see Non-Patent Literature 1).

CITATION LIST

Non-Patent Literature

Non-Patent Literature 1: Polymer Chemistry 3 (2012) 2716-2719

SUMMARY OF INVENTION

Technical Problem

The surface-modified nanodiamond disclosed in Non-Patent Literature 1, however, has poor dispersibility in an organic solvent.

Therefore, a first object of the present disclosure is to provide a surface-modified nanodiamond having excellent dispersibility in an organic solvent, or a surface-modified nanodiamond which is an intermediate for obtaining the surface-modified nanodiamond.

Furthermore, when attempts were made to introduce a surface-modifying group into the surface-modified nanodiamond disclosed in Non-Patent Literature 1, only a radical reaction method with a methacrylate group in the introduced PEGMA can be used, and the surface-modifying group that can be introduced is limited.

Accordingly, a second object of the present disclosure is to provide a method of producing surface-modified nanocarbon particles capable of introducing various surface-modifying groups into nanocarbon particles.

Solution to Problem

As a result of intensive studies to achieve the first object, the inventors of the present invention have found that a specific surface-modified nanodiamond has excellent dispersibility in an organic solvent. Also, as a result of diligent research to achieve the above second object, the inventors of the present disclosure have discovered that a variety of surface-modifying groups can be introduced into the nanocarbon particles by once introducing a specific surface-modifying group, and then using nucleophiles or electrophiles. The present invention relates to what has been completed based on these findings.

The present disclosure provides a surface-modified nanodiamond including a nanodiamond particle and a group that surface-modifies the nanodiamond particle, the group being represented by Formula (1) or (2):

[Chem. 1]

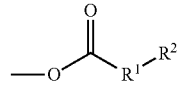

(1)

where in Formula (1), $R^1$ represents a substituted or unsubstituted divalent hydrocarbon group; and $R^2$ represents a leaving group or $[-X^1-R^3]$, where $X^1$ represents $-NH-$, $-NR^3-$, $-O-$, $-S-$, or $-O-(C=O)-$, each $R^3$ is the same or different and represents a monovalent organic group, and an atom bonded to $X^1$ is a carbon atom;

[Chem. 2]

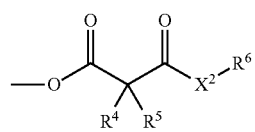

(2)

where in Formula (2), $R^4$ and $R^5$ are the same or different and each represent a hydrogen atom or a monovalent organic group; $X^2$ represents a single bond or $-O-$; and $R^6$ represents an aliphatic hydrocarbon group.

The surface-modified nanodiamond mentioned above is preferably a surface-modified nanodiamond including a nanodiamond particle and a group that surface-modifies the nanodiamond particle, the group being represented by Formula (1), where in Formula (1), $R^1$ represents a substituted or unsubstituted $C_{2-10}$ divalent hydrocarbon group; $X^1$ represents $-NH-$, $-NR^3-$, or $-O-$; and each $R^3$ is the same or different and represents a substituted or unsubstituted hydrocarbon group having 15 or more carbon atoms.

Furthermore, the surface-modified nanodiamond mentioned above is preferably a surface-modified nanodiamond including a nanodiamond particle and a group that surface-modifies the nanodiamond particle, the group being represented by Formula (2), where in Formula (2), $R^4$ and $R^5$ are the same or different and each represent a substituted or unsubstituted hydrocarbon group having 10 or more hydrogen atoms or carbon atoms.

In addition, the present disclosure provides a nanodiamond dispersion composition including a dispersion medium, and the surface-modified nanodiamond mentioned above being dispersed in the dispersion medium.

The present disclosure provides a method of producing surface-modified nanocarbon particles, the method including reacting a nanocarbon particle having a hydroxy group on its surface with a compound represented by Formula (3-1) to obtain surface-modified nanocarbon particles having a nanocarbon particle and a group that surface-modifies the nanocarbon particle, the group being represented by Formula (3-2):

[Chem. 3]

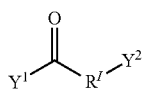
(3-1)

where in Formula (3-1), $R^I$ represents a substituted or unsubstituted divalent hydrocarbon group; $Y^1$ represents a halogen atom; and $Y^2$ represents a leaving group;

[Chem. 4]

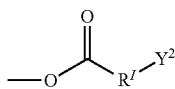
(3-2)

where in Formula (3-2), $R^I$ and $Y^2$ are each the same as described above.

The present disclosure provides a method of producing surface-modified nanocarbon particles, the method including reacting a surface-modified nanocarbon particle having a nanocarbon particle and a group that surface-modifies the nanocarbon particle, the group being represented by Formula (3-2), with a compound represented by Formula (3-3) to obtain surface-modified nanocarbon particles having a nanocarbon particle and a group that surface-modifies the nanocarbon particle, the group being represented by Formula (3-4):

[Chem. 5]

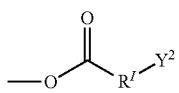
(3-2)

where in Formula (3-2), $R^I$ represents a substituted or unsubstituted divalent hydrocarbon group; and $Y^2$ represents a leaving group;

[Chem. 6]

$R^{II}$—$X^1$—H (3-3)

where in Formula (3-3), $X^1$ represents —NH—, —$NR^3$—, —O—, —S—, or —O—(C=O)—, where $R^3$ represents a monovalent organic group; $R^{II}$ represents a monovalent organic group; and an atom bonded to $X^1$ is a carbon atom;

[Chem. 7]

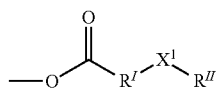
(3-4)

where in Formula (3-4), $R^I$, $X^1$, and $R^{II}$ are each the same as described above.

The present disclosure provides a method of producing surface-modified nanocarbon particles, the method including reacting a nanocarbon particle having a hydroxy group on its surface with a compound represented by Formula (4-1) to obtain surface-modified nanocarbon particles having a nanocarbon particle and a group that surface-modifies the nanocarbon particle, the group being represented by Formula (4-2):

[Chem. 8]

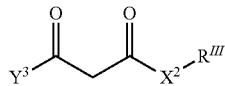
(4-1)

where in Formula (4-1), $X^2$ represents a single bond or —O—; $R^{III}$ represents an aliphatic hydrocarbon group; and $Y^3$ represents a halogen atom;

[Chem. 9]

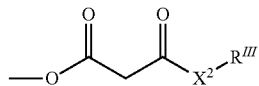
(4-2)

where in Formula (4-2), $X^2$ and $R^{III}$ are each the same as described above.

The present disclosure provides a method of producing surface-modified nanocarbon particles, the method including reacting a surface-modified nanocarbon particle having a nanocarbon particle and a group that surface-modifies the nanocarbon particle, the group being represented by Formula (4-2) with a compound represented by Formula (4-3) to obtain surface-modified nanocarbon particles having a nanocarbon particle and a group that surface-modifies the nanocarbon particle, the group being represented by Formula (4-4):

[Chem. 10]

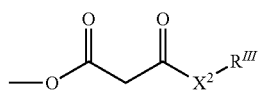
(4-2)

where in Formula (4-2), $X^2$ represents a single bond or —O—; and $R^{III}$ represents an aliphatic hydrocarbon group;

[Chem. 11]

$$R^{IV}-Y^4 \quad (4\text{-}3)$$

where in Formula (4-3), $Y^4$ represents a halogen atom; $R^{IV}$ represents a monovalent organic group; and an atom bonded to $Y^4$ is a carbon atom;

[Chem. 12]

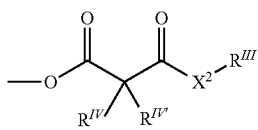

(4-4)

where in Formula (4-4), $X^2$, $R^{III}$, and $R^{IV}$ are each the same as described above, and $R^{IV'}$ represents a hydrogen atom or $R^{IV}$.

Advantageous Effects of Invention

The surface-modified nanodiamond of the present disclosure has excellent dispersibility in an organic solvent or is useful as an intermediate for obtaining the surface-modified nanodiamond. The intermediate can further be subjected to a reaction with a nucleophile or an electrophile to obtain a surface-modified nanodiamond having excellent dispersibility in an organic solvent. Also, according to the method of producing the surface-modified nanocarbon particles of the present disclosure, various surface-modifying groups can be introduced into the nanocarbon particles.

DESCRIPTION OF EMBODIMENTS

Surface-Modified Nanodiamond

Figure 1:
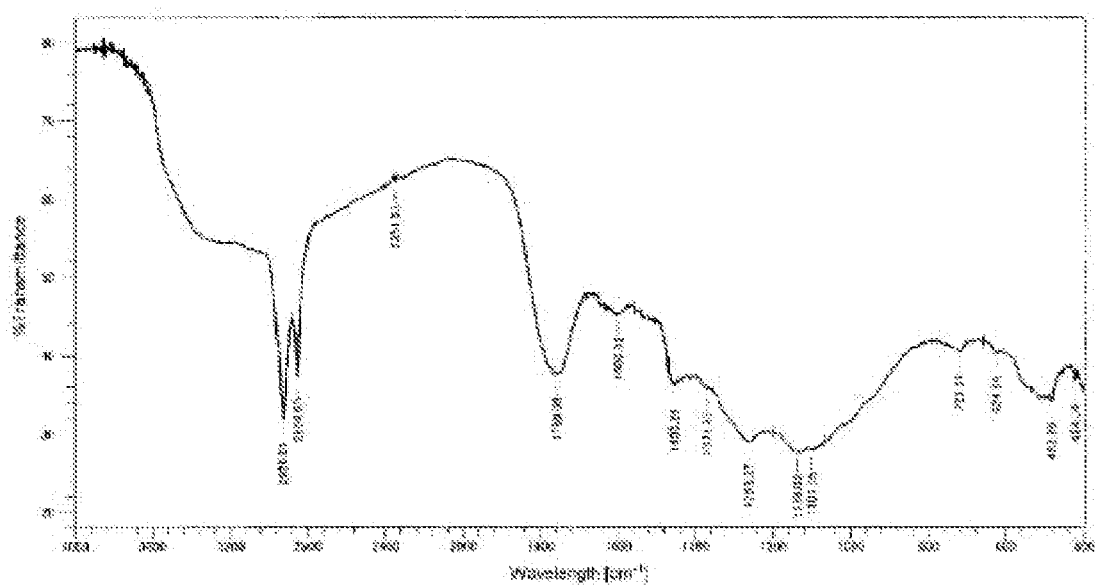
FIG. 1 is a figure showing an FT-IR spectrum of a surface-modified nanodiamond produced in Example 1.

A surface-modified nanodiamond according to an embodiment of the present disclosure (hereinafter, a nanodiamond may be referred to as "ND") includes at least a nanodiamond particle and a group that surface-modifies the nanodiamond particle, the group being represented by Formula (1) or (2). In Formulas (1) and (2), a bond extending to the left from an oxygen atom binds to an ND particle.

[Chem. 13]

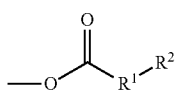

(1)

In Formula (1), $R^1$ represents a substituted or unsubstituted divalent hydrocarbon group; $R^2$ represents a leaving group or [—$X^1$—$R^3$], where $X^1$ represents —NH—, —$NR^3$—, —O—, —S—, or —O—(C=O)—, each $R^3$ is the same or different and represents a monovalent organic group, and an atom bonded to $X^1$ is a carbon atom.

[Chem. 14]

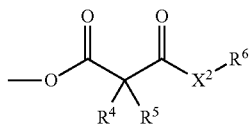

(2)

In Formula (2), $R^4$ and $R^5$ are the same or different, and each represent a hydrogen atom or a monovalent organic group; $X^2$ represents a single bond or —O—; and $R^6$ represents an aliphatic hydrocarbon group.

It is noted that, in the present specification, the group represented by Formula (1) may be referred to as a "surface-modifying group (1)", and the group represented by Formula (2) may be referred to as a "surface-modifying group (2)". Also, the surface-modifying groups (1) and (2) may be collectively referred to as a "surface-modifying group (X)". The surface-modified ND may have only one type of surface-modifying groups (X), or may have two or more types thereof.

In Formula (1), $R^1$ represents a substituted or unsubstituted divalent hydrocarbon group. Examples of the divalent hydrocarbon group include a divalent aliphatic hydrocarbon group, a divalent alicyclic hydrocarbon group, a divalent aromatic hydrocarbon group, and a group in which two or more of those listed above are bonded.

Examples of the divalent aliphatic hydrocarbon group include an alkylene group, an alkenylene group, and an alkynylene group. Examples of the alkylene group include a linear or branched $C_{1-22}$ alkylene group, such as a methylene group, an ethylene group, a propylene group, an isopropylene group, a butylene group, a hexylene group, an octylene group, an isooctylene group, a decylene group, and a dodecylene group (preferably a $C_{2-10}$ alkylene group, and more preferably a $C_{3-8}$ alkylene group). Examples of the alkenylene group include a linear or branched $C_{2-22}$ alkenylene group, such as an ethynylene group, a 1-propenylene group, an isopropenylene group, a 1-butenylene group, a 2-butenylene group, a 3-butenylene group, a 1-pentenylene group, a 2-pentenylene group, a 3-pentenylene group, a 4-pentenylene group, and a 5-hexenylene group (preferably a $C_{2-10}$ alkenylene group, and more preferably a $C_{3-8}$ alkenylene group).

Among these, the divalent aliphatic hydrocarbon group is preferably a divalent aliphatic hydrocarbon group, more preferably a linear or branched alkylene group, and even more preferably a linear alkylene group.

Examples of the divalent alicyclic hydrocarbon group include a $C_{3-12}$ cycloalkylene group, such as a cyclopropylene group, a cyclobutylene group, a cyclopentylene group, a cyclohexylene group, and a cyclododecylene group; a $C_{3-12}$ cycloalkenylene group, such as a cyclohexenylene group; and a $C_{4-15}$ crosslinked cyclic hydrocarbon group, such as a bicycloheptanylene group and a bicycloheptenylene group.

Examples of the aromatic hydrocarbon group include a $C_{6-14}$ arylene group (in particular, a $C_{6-10}$ arylene group), such as a phenylene group and a naphthylene group.

The divalent hydrocarbon group is preferably a $C_{1-22}$ hydrocarbon group, more preferably a $C_{2-10}$ hydrocarbon group, and even more preferably a $C_{3-8}$ hydrocarbon group. When the number of carbon atoms is within the aforementioned range, dispersibility in an organic solvent is superior.

The divalent hydrocarbon group may have a substituent. The number of carbon atoms of the substituent in the aforementioned hydrocarbon group is preferably from 0 to 20, and more preferably from 0 to 10. Examples of the substituent include an alkoxy group (preferably a $C_{1-6}$ alkoxy group, and more preferably a $C_{1-4}$ alkoxy group) such as a methoxy group, an ethoxy group, a propoxy group, an isopropyloxy group, a butoxy group, and an isobutyloxy group; an alkenyloxy group (preferably a $C_{2-6}$ alkenyloxy group, and more preferably a $C_{2-4}$ alkenyloxy group) such as an allyloxy group; an aryloxy group (preferably a $C_{6-14}$ aryloxy group) that may have a substituent such as a $C_{1-4}$ alkyl group, a $C_{2-4}$ alkenyl group, a $C_{1-4}$ alkoxy group, or the like on an aromatic ring, such as a phenoxy group, a tolyloxy group, and a naphthyloxy group; an aralkyloxy group (preferably a $C_{7-18}$ aralkyloxy group) such as a benzyloxy group and a phenethyloxy group; an acyloxy group (preferably a $C_{1-12}$ acyloxy group) such as an acetyloxy group, a propionyloxy group, a (meth)acryloyloxy group, and a benzoyloxy group; an alkylthio group (preferably a $C_{1-6}$ alkylthio group, and more preferably a $C_{1-4}$ alkylthio group) such as a methylthio group and an ethylthio group; an alkenylthio group (preferably a $C_{2-6}$ alkenylthio group, and more preferably a $C_{2-4}$ alkenylthio group) such as an allylthio group; an arylthio group (preferably a $C_{6-14}$ arylthio group) that may have a sub stituent such as a $C_{1-4}$ alkyl group, a $C_{2-4}$ alkenyl group, a $C_{1-4}$ alkoxy group, or the like on an aromatic ring, such as a phenylthio group, a tolylthio group, and a naphthylthio group; an aralkylthio group (preferably a $C_{7-18}$ aralkylthio group) such as a benzylthio group, a phenethylthio group; a methoxycarbonyl group, and an ethoxycarbonyl group; an alkoxycarbonyl group (preferably a $C_{1-6}$ alkoxy-carbonyl group) such as a methoxycarbonyl group, an ethoxycarbonyl group, a propoxycarbonyl group, and a butoxycarbonyl group; an aryloxycarbonyl group (preferably a $C_{6-14}$ aryloxy-carbonyl group) such as a phenoxycarbonyl group, a tolyloxycarbonyl group, and a naphthyloxycarbonyl group; an aralkyloxycarbonyl group (preferably a $C_{7-18}$ aralkyloxy-carbonyl group) such as a benzyloxycarbonyl group; a dialkylamino group (preferably a di-$C_{1-6}$ alkylamino group) such as a dimethylamino group and a diethylamino group; an acylamino group (preferably a $C_{1-11}$ acylamino group) such as an acetylamino group, a propionylamino group, and a benzoylamino group; an epoxy group-containing group such as a glycidyloxy group; an oxetanyl group-containing group such as an ethyloxetanyloxy group; an acyl group such as an acetyl group, a propionyl group, and a benzoyl group; an oxo group; and a group in which two or more of these are bonded via a $C_{1-6}$ alkylene group as necessary.

In Formula (1), $R^2$ represents a leaving group or [—$X^1$—$R^3$]. Examples of the leaving group include a halogen atom, such as a fluorine atom, a chlorine atom, a bromine atom, and an iodine atom; a sulfonyloxy group, such as a methanesulfonyloxy group, a toluenesulfonyloxy group, and a trifluoromethanesulfonyloxy group; and an acyloxy group, such as an acetyloxy group. When $R^2$ is a leaving group, various surface-modifying groups can be introduced into the ND particles, such as a surface-modified ND having excellent dispersibility in an organic solvent, by reaction with a nucleophile. As the leaving group, a halogen atom is preferred, and a bromine atom is more preferred.

When $R^2$ is [—$X^1$—$R^3$], the surface-modified ND has excellent dispersibility in an organic solvent. $X^1$ represents —NH—, —$NR^3$—, —O—, —S—, or —O—(C=O)—. Among these, from the perspective of being excellent in ease of production and dispersibility in an organic solvent, —NH—, —$NR^3$—, and —O— are preferred, and —NH— and —$NR^3$— are more preferred. It is noted that when $X^1$ represents —$NR^3$—, $R^3$ represents a monovalent organic group, and a plurality of $R^3$s in $R^2$ may be the same or different.

The $R^3$ (which is $R^3$ of [—$X^1$—$R^3$] and —$NR^3$—) represents a monovalent organic group. In the $R^3$ of [—$X^1$—$R^3$], an atom bonded to $X^1$ is a carbon atom. Examples of the monovalent organic group include a substituted or unsubstituted hydrocarbon group (a monovalent hydrocarbon group), a substituted or unsubstituted heterocyclic group (a monovalent heterocyclic group), and a group in which two or more of the aforementioned monovalent hydrocarbon group and/or the aforementioned monovalent heterocyclic group are bonded. The bonded group may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded.

Examples of the hydrocarbon group of the monovalent organic group include, for example, an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a linear or branched alkyl group, such as a methyl group, an ethyl group, a propyl group, an isopropyl group, a butyl group, a hexyl group, an octyl group, an isooctyl group, a decyl group, and a dodecyl group (preferably a $C_{2-20}$ alkyl group, and more preferably a $C_{3-18}$ alkyl group). Examples of the alkenyl group include a linear or branched alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group (preferably a $C_{4-20}$ alkenyl group, and more preferably a $C_{8-18}$ alkenyl group). Examples of the alkynyl group include a linear or branched alkynyl group, such as an ethynyl group and a propynyl group (preferably a $C_{4-20}$ alkynyl group, and more preferably a $C_{8-18}$ alkynyl group).

Examples of the alicyclic hydrocarbon group include: a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Examples of the heterocycle forming the above heterocyclic group include an aromatic heterocycle and a non-aromatic heterocycle. Examples of such a heterocycle include a 3 to 10-membered ring (preferably a 4 to 6-membered ring) having a carbon atom and at least one heteroatom (e.g., oxygen atom, sulfur atom, and nitrogen atom) as atoms constituting the ring, and a condensed ring thereof. Specific examples thereof include a heterocycle containing an oxygen atom as a heteroatom (e.g., a 3-membered ring, such as an oxirane ring; a 4-membered ring, such as an oxetane ring; a 5-membered ring, such as a furan ring, a tetrahydrofuran ring, an oxazole ring, an isoxazole ring, and a γ-butyrolactone ring; a 6-membered ring, such as a 4-oxo-4H-pyran ring, a tetrahydropyran ring, and a morpholine ring; a condensed ring, such as a benzofuran ring, an isobenzofuran ring, a 4-oxo-4H-chromene ring, a chroman ring, and an isochroman ring; and a crosslinked ring, such as a 3-oxatricyclo[4.3.1.1$^{4,8}$]undecan-2-one ring and a 3-oxatricyclo[4.2.1.0$^{4,8}$]nonan-2-one ring), a heterocycle containing a sulfur atom as a heteroatom (e.g., a 5-membered ring, such as a thiophene ring, a thiazole ring, an isothiazole ring, and a thiadiazole ring; a 6-membered ring, such as a 4-oxo-4H-thiopyran ring; and a condensed ring, such as a benzothiophene ring), and a heterocycle containing a nitrogen atom as a heteroatom (e.g., a 5-membered ring, such as a pyrrole ring, a pyrrolidine ring, a pyrazole ring, an imidazole ring, and a triazole ring; a 6-membered ring, such as an isocyanuric ring, a pyridine ring, a pyridazine ring, a pyrimidine ring, a pyrazine ring, a piperidine ring, and a piperazine ring; and a condensed ring, such as an indole ring, an indoline ring, a quinoline ring, an acridine ring, a naphthyridine ring, a quinazoline ring, and a purine ring).

Furthermore, examples of the group in which an aliphatic hydrocarbon group and an alicyclic hydrocarbon group are bonded include a cyclohexylmethyl group and a methylcyclohexyl group. Examples of the group in which an aliphatic hydrocarbon group and an aromatic hydrocarbon group are bonded include a $C_{7-18}$ aralkyl group (especially, a $C_{7-10}$ aralkyl group), such as a benzyl group and a phenethyl group; a $C_{6-10}$ aryl-$C_{2-6}$ alkenyl group, such as a cinnamyl group; a $C_{1-4}$ alkyl-substituted aryl group, such as a tolyl group; and a $C_{2-4}$ alkenyl-substituted aryl group, such as a styryl group.

Examples of the group in which two or more of the aforementioned monovalent hydrocarbon group and/or the aforementioned monovalent heterocyclic group are bonded via a linking group include a group in which the aforementioned monovalent hydrocarbon group and/or the aforementioned monovalent heterocyclic group is bonded with an alkoxy group, an alkenyloxy group, an alkynyloxy group, an aryloxy group, an aralkyloxy group, an acyloxy group, an alkylthio group, an alkenylthio group, an arylthio group, an aralkylthio group, an acyl group, an alkenylcarbonyl group, an arylcarbonyl group, an aralkylcarbonyl group, an alkoxycarbonyl group, an alkenyloxycarbonyl group, an aryloxycarbonyl group, an aralkyloxycarbonyl group, a dialkylamino group, an acylamino group, an oxetanyl group-containing group, or a carbamoyl group, or, a group in which the aforementioned monovalent hydrocarbon group and/or the aforementioned monovalent heterocyclic group is bonded with two or more of the groups listed above.

The monovalent organic group may have a substituent. Examples of the substituent include a halogen atom, such as a fluorine atom, a chlorine atom, a bromine atom, and an iodine atom; a cyano group; an isocyanate group; an isothiocyanate group; a hydroxy group; a carboxy group; a mercapto group; and an amino group.

Among these, from the perspective of achieving superior dispersibility in an organic solvent, a monovalent substituted or unsubstituted hydrocarbon group is preferred as the monovalent organic group.

The monovalent organic group (in particular, a monovalent substituted or unsubstituted hydrocarbon group) preferably has 10 or more (e.g., 10 to 22) carbon atoms, and more preferably 15 or more (e.g., 15 to 20) carbon atoms. When the number of carbon atoms is 10 or more, dispersibility in an organic solvent is superior.

When $R^2$ represents [—$X^1$—$R^3$], from the perspective of achieving superior dispersibility in an organic solvent, the total number of carbon atoms (in particular, the number of carbon atoms constituting the hydrocarbon group) in $R^1$ and $R^3$ (in a case where $X^1$ represents —$NR^3$—, the total number of carbon atoms in $R^1$ and two $R^3$s) is preferably 10 or more, more preferably 15 or more, and even more preferably 18 or more. The total number of carbon atoms is, for example, 30 or less, and preferably 25 or less. When the number of carbon atoms is 30 or less, the surface-modifying groups are kept from being entangled, and dispersion in the dispersion medium is facilitated.

In Formula (2), $R^4$ and $R^5$ are the same or different, and each represent a hydrogen atom or a monovalent organic group; When at least one of $R^4$ or $R^5$ is a hydrogen atom, various surface-modifying groups can be introduced into the ND particles, such as a surface-modified ND having excellent dispersibility in an organic solvent, by reaction with an electrophile.

Examples of the monovalent organic group in $R^4$ and $R^5$ include those exemplified and described as $R^3$ in the group represented by Formula (1). Among these, from the perspective of achieving superior dispersibility in an organic solvent, a monovalent substituted or unsubstituted hydrocarbon group is preferred as the monovalent organic group.

The monovalent organic group (in particular, a monovalent substituted or unsubstituted hydrocarbon group) preferably has 10 or more (e.g., 10 to 22) carbon atoms, and more preferably 15 or more (e.g., 15 to 20) carbon atoms. When the number of carbon atoms is 10 or more, dispersibility in an organic solvent is superior.

In Formula (2), $X^2$ represents a single bond or —O—.

In Formula (2), $R^6$ represents an aliphatic hydrocarbon group. Examples of the above-mentioned aliphatic hydrocarbon group include linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among the groups, the linear or branched alkyl groups are preferred. Furthermore, the aliphatic hydrocarbon group is preferably a $C_{1-4}$ aliphatic hydrocarbon group.

The ND particle constituting the surface-modified ND preferably contains a primary particle of the nanodiamond. In addition, a secondary particle in which several to dozens of the primary particles aggregated (agglutinated) may be included. Furthermore, a surface of the surface-modified ND may have one or two or more of other surface functional groups, in addition to the surface-modifying group (X).

A mass ratio of the ND to the surface-modifying group (X) in the surface-modified ND [ND/surface-modifying group (X)] is not particularly limited, but is preferably 0.5 or greater, and more preferably 2.5 or greater. When the mass ratio is 0.5 or greater (in particular, 2.5 or greater), properties as a nanodiamond material are less likely to be impaired. The mass ratio [ND/surface-modifying group (X)] is not particularly limited, but is preferably 15.0 or less, and more preferably 7.0 or less. When the mass ratio is 15.0 or less (in particular, 7.0 or less), the degree of modification of the surface-modifying group (X) is sufficient, and dispersibility in an organic solvent is superior. The mass ratio can be determined based on a weight loss rate as measured by thermogravimetric analysis, with the weight loss being considered as the mass of the surface-modifying group (X).

The surface-modified ND has excellent dispersibility in an organic solvent, and when the structure of the ND particles is controlled by adjusting $R^1$, $R^3$, and $X^1$ in the surface-modifying group (1), or adjusting $R^4$, $R^5$, $R^6$, and $X^2$ in the surface-modifying group (2), or the like, dispersibility in various organic solvents and affinity for resins are achieved. For this reason, the surface-modified ND can be used in the fields of engineering application, such as polishing agents for CMP, dresser materials, corrosion-resistant electrode plating materials for fuel cells, high-hardness surface coating layer forming materials for cutting tools and the like, and high heat-resistance and high thermal-conductivity materials.

The particle size (D50) of the aforementioned surface-modified ND is, for example, 400 nm or less, preferably 300 nm or less, more preferably 100 nm or less, and even more preferably 50 nm or less. The lower limit of the particle size (D50) of the surface-modified ND is, for example, 5 nm. Furthermore, the particle size (D90) is, for example, 500 nm or less, preferably 180 nm or less, and more preferably 170 nm or less. The lower limit of the particle size (D90) of the surface-modified NDs is, for example, 50 nm. A smaller particle size of the surface-modified ND is preferred in that high transparency of the composite material described below is achieved. It is noted that the (average) particle size of the surface-modified ND can be measured by a dynamic light scattering method.

The surface-modified ND can be produced by the method of producing surface-modified nanocarbon particles described below.

Method of Producing Surface-Modified Nanocarbon Particles (A) and (B)

The method of producing surface-modified nanocarbon particles according to an embodiment (first embodiment) of the present disclosure includes at least a step (may be referred to as "reaction step (A)") of reacting a nanocarbon particle having a hydroxy group on its surface with a compound represented by Formula (3-1) to obtain surface-modified nanocarbon particles having a nanocarbon particle and a group that surface-modifies the nanocarbon particle, the group being represented by Formula (3-2): The surface-modified nanocarbon particles obtained according to the first embodiment are useful as intermediates into which various surface-modifying groups can be introduced by reacting with various nucleophiles. They can also be used as surface-modified NDs having the surface-modifying groups (1) or intermediates for producing the surface-modified NDs. It is noted that the surface-modified nanocarbon particles having nanocarbon particles and groups that surface modify the nanocarbon particles, the groups being represented by Formula (3-2), may be referred to as "surface-modified nanocarbon particles (A)".

[Chem. 15]

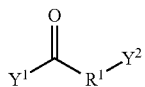

(3-1)

where in Formula (3-1), $R^I$ represents a substituted or unsubstituted divalent hydrocarbon group; $Y^1$ represents a halogen atom; and $Y^2$ represents a leaving group.

[Chem. 16]

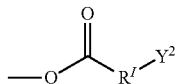

(3-2)

where in Formula (3-2), $R^I$ and $Y^2$ are each the same as described above.

In the reaction step (A), the nanocarbon particle having a hydroxy group on its surface is subjected to the reaction with the compound represented by Formula (3-1), and an oxygen atom of the hydroxy group in the nanocarbon particles and a carbonyl carbon in the compound represented by Formula (3-1) are bonded to form an ester bond, to thereby yield surface-modified nanocarbon particles (A).

The nanocarbon particles described above are not particularly limited, and particles of a known or commonly used nano-order carbon material (nanocarbon material) can be used. Examples of the nanocarbon material of the nanocarbon particles include nanodiamonds, fullerenes, graphene oxide, nanographite, carbon nanotubes, carbon nanofilaments, onion-like carbon, diamond-like carbon, amorphous carbon, carbon black, carbon nanohorns, and carbon nanocoils. Among these, nanodiamond particles (ND particles) are preferable as the nanocarbon particles. As the nanocarbon particles, only one type or two or more types may be used.

The above ND particles are not particularly limited, and known or commonly used nanodiamond particles can be used. The ND particles inherently have carboxy groups and hydroxy groups generated in the production process. As the ND particles, only one type or two or more types may be used.

As the ND particles mentioned above, for example, detonation ND (i.e., ND produced by detonation method) and high temperature and high pressure method ND (i.e., ND produced by a high temperature and high pressure method) can be used. Above all, the detonation ND is preferred in that dispersibility in the dispersion medium is superior, i.e., in that the primary particle has a single-digit nanometer size.

The detonation ND mentioned above includes air-cooling detonation ND (i.e., ND produced by an air-cooling detonation method) and water-cooling detonation ND (i.e., ND produced by a water-cooling detonation method). Above all, the air-cooling detonation ND is preferred in that smaller primary particles are obtained compared to the case of the water-cooling detonation ND.

As the compound represented by Formula (3-1), only one type or two or more types may be used.

In Formula (3-1), $R^I$ represents a substituted or unsubstituted divalent hydrocarbon group. Examples of the substituted or unsubstituted divalent hydrocarbon group include the substituted or unsubstituted divalent hydrocarbon groups exemplified and described as $R^I$ in Formula (1).

Among these, the divalent aliphatic hydrocarbon group is preferably a divalent aliphatic hydrocarbon group, more preferably a linear or branched alkylene group, and even more preferably a linear alkylene group.

The divalent hydrocarbon group is preferably a $C_{1-22}$ hydrocarbon group, more preferably a $C_{2-10}$ hydrocarbon group, and even more preferably a $C_{3-8}$ hydrocarbon group. When the number of carbon atoms is within the aforementioned range, dispersibility in an organic solvent is superior.

In Formula (3-1), $Y^1$ represents a halogen atom. Examples of the halogen atom include a fluorine atom, a chlorine atom, a bromine atom, and an iodine atom. From the perspective of achieving better reactivity between the nanocarbon particles and the compound represented by Formula (3-1), $Y^1$ is preferably a chlorine atom.

In Formula (3-1), $Y^2$ represents a leaving group. Examples of the leaving group include a halogen atom, such as a fluorine atom, a chlorine atom, a bromine atom, and an iodine atom; a sulfonyloxy group, such as a methanesulfonyloxy group, a toluenesulfonyloxy group, and a trifluoromethanesulfonyloxy group; and an acyloxy group, such as an acetyloxy group. From the perspective of achieving better reactivity between the obtained surface-modified nanocarbon particles and nucleophiles, $Y^2$ is preferably a halogen atom and more preferably a bromine atom.

From the perspective of achieving better reactivity between the nanocarbon particles and the compound represented by Formula (3-1), the reaction step (A) is preferably performed in a state where the nanocarbon particles are dispersed in a dispersion medium. The dispersion medium is preferably an organic solvent. Examples of the organic solvent mentioned above include aliphatic hydrocarbons, such as hexane, heptane, and octane (in particular, linear saturated aliphatic hydrocarbons); aromatic hydrocarbons, such as benzene, toluene, and xylene; alicyclic hydrocarbons, such as cyclohexane and methylcyclohexane; aprotic polar solvents, such as dimethylformamide (DMF), dimethylacetamide, N-methylpyrrolidone, and dimethyl sulfoxide; alcohols, such as methanol; halogenated hydrocarbons, such as chloroform, dichloromethane, dichloroethane, carbon tetrachloride, chlorobenzene, and trifluoromethylbenzene; chain or cyclic ethers, such as diethyl ether, diisopropyl ether, dimethoxyethane, tetrahydrofuran (THF), and dioxane; esters, such as ethyl acetate and butyl acetate; chain ketones, such as methyl ethyl ketone (MEK) and methyl isobutyl ketone; and nitriles such as acetonitrile. Among these, aromatic hydrocarbons are preferred, and toluene is more preferred, from the perspective of achieving particularly excellent dispersibility of the nanocarbon particles, the compound represented by Formula (3-1), and the surface-modified nanocarbon particles (A).

As described above, the reaction step (A) is performed in a state where the nanocarbon particles are nanodispersed in the organic solvent, that is, in a dispersion composition of the nanocarbon particles. The nanocarbon particles in the dispersion composition preferably have a median diameter (D50) from 1 to 100 nm, and more preferably from 1 to 50 nm. When the median diameter is within such a range, the amount of hydroxy groups on the surfaces of the nanocarbon particles is large, and the reaction with the compound represented by Formula (3-1) proceeds more. In addition, the dispersibility of the obtained surface-modified nanocarbon particles (A) is excellent.

A ratio of the nanocarbon particles to the compound represented by Formula (3-1) (former:latter, ratio by mass) supplied for the reaction step (A) is, for example, from 1:25 to 1:1. In addition, a concentration of the nanocarbon particles in the dispersion composition is, for example, from 1 to 10 mass %, and a concentration of the compound represented by Formula (3-1) in the dispersion composition is, for example, from 1 to 60 mass %.

Reaction conditions for the nanocarbon particles and the compound represented by Formula (3-1) can be appropriately selected from, for example, a temperature from 0 to 150° C., a reaction time from 1 to 48 hours, and a pressure from 1 to 5 atm.

The reaction in the reaction step (A) yields surface-modified nanocarbon particles (A) having nanocarbon particles and groups that surface-modify the nanocarbon particles, the groups being represented by Formula (3-2). In Formula (3-2), $R^I$ and $Y^2$ are the same as those in Formula (3-1). Specifically, $R^I$ represents a substituted or unsubstituted divalent hydrocarbon group, and $Y^2$ represents a leaving group. In Formula (3-2), a bond extending to the left from an oxygen atom binds to a nanocarbon particle.

After the reaction step (A), the obtained surface-modified nanocarbon particles (A) may be subjected to a purification step. For example, as the purification step, the surface-modified nanocarbon particles (A) are precipitated by centrifugation, and the precipitated surface-modified nanocarbon particles (A) are separated by decantation, filtration, or the like (separation step), and then washed with a washing solvent such as methanol or acetone (washing step). Thereafter, a drying step may further be provided. Through the drying step, powdery surface-modified nanocarbon particles (A) can be obtained.

The method of producing surface-modified nanocarbon particles according to another embodiment (second embodiment) of the present disclosure includes at least a step (may be referred to as "reaction step (B)") of reacting surface-modified nanocarbon particles (surface-modified nanocarbon particles (A)) having a nanocarbon particle and a group that surface-modifies the nanocarbon particle, the group being represented by Formula (3-2), with a compound represented by Formula (3-3) to obtain surface-modified nanocarbon particles having a nanocarbon particle and a group that surface-modifies the nanocarbon particle, the group being represented by Formula (3-4): The surface-modified nanocarbon particles obtained according to the second embodiment can be obtained by introducing various surface-modifying groups by appropriately selecting and reacting the compound represented by Formula (3-3). It is noted that the surface-modified nanocarbon particles having nanocarbon particles and groups represented by Formula (3-4) that surface modify the nanocarbon particles may be referred to as "surface-modified nanocarbon particles (B)".

[Chem. 17]

$$R^{II}-X^1-H \quad (3\text{-}3)$$

where in Formula (3-3), $X^1$ represents —NH—, —NR$^3$—, —O—, —S—, or —O—(C=O)—; $R^3$ represents a monovalent organic group; $R^{II}$ represents a monovalent organic group; and an atom bonded to $X^1$ is a carbon atom.

[Chem. 18]

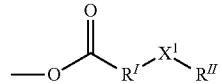

(3-4)

where in Formula (3-4), $R^I$, $X^1$, and $R^{II}$ are each the same as described above.

In the reaction step (B), the surface-modified nanocarbon particles (A) and the compound represented by Formula (3-3) are reacted, and the carbon atom bonded to $Y^2$ in the surface-modified nanocarbon particles (A) and $X^1$ in the compound represented by Formula (3-3) are bonded to each other to obtain surface-modified nanocarbon particles (B) in which $R^I$ and $R^{II}$ are bonded via $X^1$.

Examples of the compound represented by Formula (3-3) include primary amines, secondary amines, alcohols, thiols, and carboxylic acids. As the compound represented by Formula (3-3), only one type or two or more types may be used.

In Formula (3-3), $X^1$ represents —NH—, —$NR^3$—, —O—, —S—, or —O—(C=O)—. Among these, from the perspective of being excellent in ease of production and dispersibility in an organic solvent, —NH—, —$NR^3$—, and —O— are preferred, and —NH— and —$NR^3$— are more preferred. It is noted that when $X^1$ represents —$NR^3$—, $R^3$ represents a monovalent organic group. Examples of the monovalent organic group include the monovalent organic groups exemplified and described as $R^3$ in Formula (1).

In Formula (3-3), $R^{II}$ represents a monovalent organic group. Examples of the monovalent organic group include the monovalent organic groups exemplified and described as $R^3$ in Formula (1).

As the monovalent organic group in each of the $R^3$ and the $R^{II}$, from the perspective of achieving superior dispersibility in an organic solvent, a monovalent substituted or unsubstituted hydrocarbon group is preferred. The $R^3$ and the $R^{II}$ may be the same or different.

The monovalent organic group (in particular, a monovalent substituted or unsubstituted hydrocarbon group) preferably has 10 or more (e.g., 10 to 22) carbon atoms, and more preferably 15 or more (e.g., 15 to 20) carbon atoms. When the number of carbon atoms is 10 or more, dispersibility in an organic solvent is superior.

From the perspective of achieving superior dispersibility in an organic solvent, the monovalent organic group that is $R^{II}$ is preferably selected such that the total number of carbon atoms (in particular, the number of carbon atoms constituting the hydrocarbon group) in $R^I$ and $R^{II}$ is 10 or more, more preferably 15 or more, and even more preferably 18 or more. The total number of carbon atoms is, for example, 30 or less, and preferably 25 or less. When the number of carbon atoms is 30 or less, the surface-modifying groups are kept from being entangled, and dispersion in the dispersion medium is facilitated. When $X^1$ represents —$NR^3$—, the total number of carbon atoms in $R^I$, $R^{II}$, and $R^3$ is preferably within the aforementioned range.

From the perspective of achieving better reactivity between the surface-modified nanocarbon particles (A) and the compound represented by Formula (3-3), the reaction step (B) is preferably performed in a state where the surface-modified nanocarbon particles (A) are dispersed in a dispersion medium. The dispersion medium is preferably an organic solvent. Examples of the organic solvent include those exemplified and described as the organic solvent usable in the reaction step (A) described above. Among these, aromatic hydrocarbons are preferred, and toluene is more preferred, from the perspective of achieving particularly excellent dispersibility of the surface-modified nanocarbon particles (A), the compound represented by Formula (3-3), and the surface-modified nanocarbon particles (B).

As described above, the reaction step (B) is performed in a state where the surface-modified nanocarbon particles (A) are nanodispersed in the organic solvent, that is, in a dispersion composition of the surface-modified nanocarbon particles (A). The surface-modified nanocarbon particles (A) in the dispersion composition preferably have a median diameter (D50) from 1 to 100 nm, and more preferably from 1 to 50 nm. When the median diameter is within such a range, the amount of reactive groups on the surfaces of the surface-modified nanocarbon particles (A) is large, and the reaction with the compound represented by Formula (3-3) proceeds more. In addition, the dispersibility of the obtained surface-modified nanocarbon particles (B) is excellent.

A ratio of the surface-modified nanocarbon particles (A) to the compound represented by Formula (3-3) (former: latter, ratio by mass) supplied for the reaction step (B) is, for example, from 1:25 to 1:1. In addition, a concentration of the surface-modified nanocarbon particles (A) in the dispersion composition is, for example, from 1 to 10 mass %, and a concentration of the compound represented by Formula (3-3) in the dispersion composition is, for example, from 1 to 60 mass %.

Reaction conditions for the surface-modified nanocarbon particles (A) and the compound represented by Formula (3-3) can be appropriately selected from, for example, a temperature from 0 to 150° C., a reaction time from 1 to 48 hours, and a pressure from 1 to 5 atm.

The reaction in the reaction step (B) yields surface-modified nanocarbon particles (B) having nanocarbon particles and groups that surface-modify the nanocarbon particles, the groups being represented by Formula (3-4). In Formula (3-4), $R^I$, $X^1$, and $R^{II}$ are the same as those in Formulas (3-2) and (3-3). Specifically, $R^I$ represents a substituted or unsubstituted divalent hydrocarbon group, $X^1$ represents —NH—, —$NR^3$—, —O—, —S—, or —O—(C=O)—, and $R^{II}$ represents a monovalent organic group. In Formula (3-4), a bond extending to the left from an oxygen atom binds to a nanocarbon particle.

As described above, the surface-modified nanocarbon particles (A) and (B) are obtained.

Method of Producing Surface-Modified Nanocarbon Particles (C) and (D)

The method of producing surface-modified nanocarbon particles according to yet another embodiment (third embodiment) of the present disclosure includes at least a step (may be referred to as "reaction step (C)") of reacting a nanocarbon particle having a hydroxy group on its surface with a compound represented by Formula (4-1) to obtain surface-modified nanocarbon particles having a nanocarbon particle and a group that surface-modifies the nanocarbon particle, the group being represented by Formula (4-2): The surface-modified nanocarbon particles obtained according to the third embodiment are useful as intermediates into which various surface-modifying groups can be introduced by reacting with various electrophiles. They can also be used as surface-modified NDs having the surface-modifying groups (2) or intermediates for producing the surface-modified NDs. It is noted that the surface-modified nanocarbon particles having nanocarbon particles and groups that surface modify the nanocarbon particles, the groups being represented by Formula (4-2), may be referred to as "surface-modified nanocarbon particles (C)".

[Chem. 19]

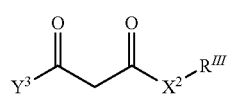

(4-1)

where in Formula (4-1), $X^2$ represents a single bond or —O—; $R^{III}$ represents an aliphatic hydrocarbon group; and $Y^3$ represents a halogen atom;

[Chem. 20]

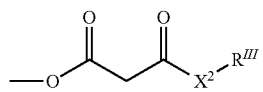

(4-2)

where in Formula (4-2), $X^2$ and $R^{III}$ are each the same as described above.

In the reaction step (C), the nanocarbon particle having a hydroxy group on its surface is subjected to the reaction with the compound represented by Formula (4-1), and an oxygen atom of the hydroxy group in the nanocarbon particles and a carbonyl carbon bonded to $Y^3$ in the compound represented by Formula (4-1) are bonded to form an ester bond, to thereby yield surface-modified nanocarbon particles (C).

The nanocarbon particles described above are not particularly limited, and particles of a known or commonly used nano-order carbon material (nanocarbon material) can be used. Examples of the nanocarbon material in the nanocarbon particles include those exemplified and described as the nanocarbon material used in the reaction step (A) described above. Among these, ND particles are preferable as the nanocarbon particles. As the nanocarbon particles, only one type or two or more types may be used.

As the ND particles, above all, the detonation ND is preferred, and the air-cooling detonation ND is more preferred, in that dispersibility in the dispersion medium is superior, i.e., in that the primary particle has a single-digit nanometer size.

As the compound represented by Formula (4-1), only one type or two or more types may be used.

In Formula (4-1), $X^2$ represents a single bond or —O—.

In Formula (4-1), $R^{III}$ represents an aliphatic hydrocarbon group. Examples of the aliphatic hydrocarbon group include the aliphatic hydrocarbon groups exemplified and described as $R^6$ in Formula (2). Among the groups, $R^{III}$ is preferably a linear or branched alkyl group. Furthermore, the aliphatic hydrocarbon group is preferably a $C_{1-4}$ aliphatic hydrocarbon group.

In Formula (4-1), $Y^3$ represents a halogen atom. Examples of the halogen atom include a fluorine atom, a chlorine atom, a bromine atom, and an iodine atom. From the perspective of achieving better reactivity between the nanocarbon particles and the compound represented by Formula (4-1), $Y^3$ is preferably a chlorine atom.

From the perspective of achieving better reactivity between the nanocarbon particles and the compound represented by Formula (4-1), the reaction step (C) is preferably performed in a state where the nanocarbon particles are dispersed in a dispersion medium. The dispersion medium is preferably an organic solvent. Examples of the organic solvent include those exemplified and described as the organic solvent usable in the reaction step (A) described above. Among these, aromatic hydrocarbons are preferred, and toluene is more preferred, from the perspective of achieving particularly excellent dispersibility of the nanocarbon particles, the compound represented by Formula (3-1), and the surface-modified nanocarbon particles (C).

As described above, the reaction step (C) is performed in a state where the nanocarbon particles are nanodispersed in the organic solvent, that is, in a dispersion composition of the nanocarbon particles. The nanocarbon particles in the dispersion composition preferably have a median diameter (D50) from 1 to 100 nm, and more preferably from 1 to 50 nm. When the median diameter is within such a range, the amount of hydroxy groups on the surfaces of the nanocarbon particles is large, and the reaction with the compound represented by Formula (4-1) proceeds more. In addition, the dispersibility of the obtained surface-modified nanocarbon particles (C) is excellent.

A ratio of the nanocarbon particles to the compound represented by Formula (4-1) (former:latter, ratio by mass) supplied for the reaction step (C) is, for example, from 1:25 to 1:1. In addition, a concentration of the nanocarbon particles in the dispersion composition is, for example, from 1 to 10 mass %, and a concentration of the compound represented by Formula (4-1) in the dispersion composition is, for example, from 1 to 60 mass %.

Reaction conditions for the nanocarbon particles and the compound represented by Formula (4-1) can be appropriately selected from, for example, a temperature from 0 to 100° C., a reaction time from 1 to 48 hours, and a pressure from 1 to 5 atm.

The reaction in the reaction step (C) yields surface-modified nanocarbon particles (C) having nanocarbon particles and groups that surface-modify the nanocarbon particles, the groups being represented by Formula (4-2). In Formula (4-2), $X^2$ and $R^{III}$ are the same as those in Formula (4-1). Specifically, $X^2$ represents a single bond or —O—, and $R^{III}$ represents an aliphatic hydrocarbon group. In Formula (4-2), a bond extending to the left from an oxygen atom binds to a nanocarbon particle.

After the reaction step (C), the obtained surface-modified nanocarbon particles (C) may be subjected to a purification step. For example, as the purification step, the surface-modified nanocarbon particles (C) are precipitated by centrifugation, and the precipitated surface-modified nanocarbon particles (C) are separated by decantation, filtration, or the like (separation step), and then washed with a washing solvent such as methanol or acetone (washing step). Thereafter, a drying step may further be provided. Through the drying step, powdery surface-modified nanocarbon particles (C) can be obtained.

The method of producing surface-modified nanocarbon particles according to yet another embodiment (fourth embodiment) of the present disclosure includes at least a step (may be referred to as "reaction step (D)") of reacting surface-modified nanocarbon particles (surface-modified nanocarbon particles (C)) having a nanocarbon particle and a group that surface-modifies the nanocarbon particle, the group being represented by Formula (4-2), with a compound represented by Formula (4-3) to obtain surface-modified nanocarbon particles having a nanocarbon particle and a group that surface-modifies the nanocarbon particle, the group being represented by Formula (4-4). The surface-modified nanocarbon particles obtained according to the fourth embodiment can be obtained by introducing various surface-modifying groups by appropriately selecting and reacting the compound represented by Formula (4-3). It is noted that the surface-modified nanocarbon particles having nanocarbon particles and groups that surface modify the nanocarbon particles, the groups being represented by Formula (4-4), may be referred to as "surface-modified nanocarbon particles (D)".

[Chem. 21]

$$R^{IV}\text{—}Y^4 \quad (4\text{-}3)$$

where in Formula (4-3), $Y^4$ represents a halogen atom; $R^{IV}$ represents a monovalent organic group; and an atom bonded to $Y^4$ is a carbon atom.

[Chem. 22]

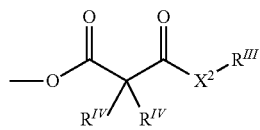

(4-4)

where in Formula (4-4), $X^2$, $R^{III}$, and $R^{IV}$ are each the same as described above, and $R^{IV'}$ represents a hydrogen atom or $R^{IV}$.

In the reaction step (D), the surface-modified nanocarbon particles (C) and the compound represented by Formula (4-3) are reacted, and the carbon atom of the methylene group in the surface-modified nanocarbon particles (C) and the carbon atom bonded to $Y^4$ in the compound represented by Formula (4-3) are bonded to each other to obtain surface-modified nanocarbon particles (D) in which a carbon to carbon bond is formed.

As the compound represented by Formula (4-3), only one type or two or more types may be used.

In Formula (4-3), $R^{IV}$ represents a monovalent organic group. Examples of the monovalent organic group include the monovalent organic groups exemplified and described as $R^3$ in Formula (1).

From the perspective of achieving superior dispersibility in an organic solvent, a monovalent substituted or unsubstituted hydrocarbon group is preferred as the monovalent organic group.

The monovalent organic group (in particular, a monovalent substituted or unsubstituted hydrocarbon group) preferably has 10 or more (e.g., 10 to 22) carbon atoms, and more preferably 15 or more (e.g., 15 to 20) carbon atoms. When the number of carbon atoms is 10 or more, dispersibility in an organic solvent is superior.

In Formula (4-3), $Y^4$ represents a halogen atom. Examples of the halogen atom include a fluorine atom, a chlorine atom, a bromine atom, and an iodine atom. From the perspective of achieving better reactivity between the surface-modified nanocarbon particles (C) and the compound represented by Formula (4-3), $Y^4$ is preferably a bromine atom or an iodine atom.

The reaction step (D) is preferably performed in the presence of a basic catalyst. A known or commonly used basic catalyst that can be used in a nucleophilic substitution reaction can be used as the basic catalyst. Examples of the basic catalyst include amines (secondary amines, tertiary amines, and the like) such as piperidine, N-methylpiperidine, pyrrolidine, N-methylpyrrolidine, morpholine, N-methylmorpholine, diethylamine, triethylamine, diazabicycloundecene, and diazabicyclononene; nitrogen-containing heterocyclic compounds such as pyridine; alkali metal alkoxides such as sodium methoxide and sodium ethoxide; alkali metal carboxylate such as sodium acetate; alkali metal hydroxides such as sodium hydroxide and potassium hydroxide; alkali metal carbonates such as sodium carbonate and potassium carbonate; alkali metal hydrogen carbonates such as sodium hydrogen carbonate and potassium hydrogen carbonate; alkaline earth metal hydroxides such as magnesium hydroxide and barium hydroxide; alkaline earth metal carbonates such as magnesium carbonate and barium carbonate; alkali metal hydrides such as sodium hydride; alkali metal amides such as sodium amide and potassium amide; and the like.

From the perspective of achieving better reactivity between the surface-modified nanocarbon particles (C) and the compound represented by Formula (4-3), the reaction step (D) is preferably performed in a state where the surface-modified nanocarbon particles (C) are dispersed in a dispersion medium. The dispersion medium is preferably an organic solvent. Examples of the organic solvent include those exemplified and described as the organic solvent usable in the reaction step (A) described above. Among these, aromatic hydrocarbons are preferable, and toluene is more preferable, from the perspective of achieving particularly excellent dispersibility of the surface-modified nanocarbon particles (C), the compound represented by Formula (4-3), and the surface-modified nanocarbon particles (D).

As described above, the reaction step (D) is performed in a state where the surface-modified nanocarbon particles (C) are nanodispersed in the organic solvent, that is, in a dispersion composition of the surface-modified nanocarbon particles (C). The surface-modified nanocarbon particles (C) in the dispersion composition preferably have a median diameter (D50) from 1 to 100 nm, and more preferably from 1 to 50 nm. When the median diameter is within such a range, the amount of reactive groups on the surfaces of the surface-modified nanocarbon particles (C) is large, and the reaction with the compound represented by Formula (4-3) proceeds more. In addition, the dispersibility of the obtained surface-modified nanocarbon particles (D) is excellent.

A ratio of the surface-modified nanocarbon particles (C) to the compound represented by Formula (4-3) (former: latter, ratio by mass) supplied for the reaction step (D) is, for example, from 1:25 to 1:1. In addition, a concentration of the surface-modified nanocarbon particles (C) in the dispersion composition is, for example, from 1 to 10 mass %, and a concentration of the compound represented by Formula (4-3) in the dispersion composition is, for example, from 1 to 60 mass %.

Reaction conditions for the surface-modified nanocarbon particles (C) and the compound represented by Formula (4-3) can be appropriately selected from, for example, a temperature from 0 to 150° C., a reaction time from 1 to 48 hours, and a pressure from 1 to 5 atm.

The reaction in the reaction step (D) yields surface-modified nanocarbon particles (D) having nanocarbon particles and groups that surface-modify the nanocarbon particles, the groups being represented by Formula (4-4). In Formula (4-4), $X^2$, $R^{III}$, and $R^{IV}$ are the same as those in Formulas (4-2) and (4-3). Specifically, $X^2$ represents a single bond or —O—, $R^{III}$ represents an aliphatic hydrocarbon group, and $R^{IV}$ represents a monovalent organic group. In Formula (4-4), a bond extending to the left from an oxygen atom binds to a nanocarbon particle.

In Formula (4-4), $R^{IV'}$ represents $R^{IV}$ or a hydrogen atom. When $R^{IV'}$ is a hydrogen atom, the obtained surface-modified nanocarbon particles (D) can be further reacted with the compound represented by Formula (4-3). As a result, surface-modified nanocarbon particles (D) with $R^{IV'}$ being $R^{IV}$ are obtained. It is noted that, when $R^{IV'}$ is $R^{IV}$, these two $R^{IV}$s may be the same or different.

As described above, the surface-modified nanocarbon particles (C) and (D) are obtained.

A mass ratio of the nanocarbon particle to the surface-modifying group in the surface-modified nanocarbon particles (A) to (D) [nanocarbon particle/surface-modifying group] is not particularly limited, but is preferably 0.5 or greater, and more preferably 2.5 or greater. When the mass ratio is 0.5 or greater (in particular, 2.5 or greater), properties as a nanocarbon material are less likely to be impaired. The mass ratio [ND/surface-modifying group (X)] is not particularly limited, but is preferably 15.0 or less, and more preferably 7.0 or less. When the mass ratio is 15.0 or less (in particular, 7.0 or less), the degree of modification of the surface-modifying group is sufficient. The mass ratio can be determined based on a weight loss rate as measured by thermogravimetric analysis, with the weight loss being considered as the mass of the surface-modifying group.

The particle size (D50) of the surface-modified nanocarbon particles (A) to (D) is, for example, 400 nm or less, preferably 300 nm or less, more preferably 100 nm or less, and even more preferably 50 nm or less. The lower limit of the particle size (D50) of the surface-modified nanocarbon particles is, for example, 5 nm. Furthermore, the particle size (D90) is, for example, 500 nm or less, preferably 180 nm or less, and more preferably 170 nm or less. The lower limit of the particle size (D90) of the surface-modified nanocarbon particles is, for example, 50 nm. A smaller particle size of the surface-modified nanocarbon particle is preferred in that high transparency of the composite material described below is achieved. It is noted that the (average) particle size of the surface-modified nanocarbon particles can be measured by a dynamic light scattering method.

The production method may include other steps in addition to the reaction step described above. For example, to obtain a dispersion composition in which the nanocarbon particles are in a state of being nanodispersed, disintegration may be performed before the reaction steps (A) to (C) described above. In addition, when the nanocarbon particles are ND particles, the other steps may include forming (formation) ND particles by a detonation method, acid treatment, and oxidation treatment before the reaction step or the disintegration step described above.

Nanocarbon Particle Dispersion Composition

The aforementioned surface-modified ND or the surface-modified nanocarbon particles obtained by the production method described above are dispersed in a dispersion medium to thereby obtain a nanocarbon particle dispersion composition containing the dispersion medium and the surface-modified nanocarbon particles dispersed in the dispersion medium. It is noted that, in a case where ND agglutinates remain after completion of the reaction, a liquid formed after the completion of the reaction is left to stand, the supernatant liquid is thereafter collected and may be used as a nanocarbon particle dispersion composition. Furthermore, after the dispersion composition obtained by the production method described above is obtained, before or after the reaction solvent in the dispersion composition is distilled off by an evaporator or the like, a new dispersion medium is mixed and stirred, that is, the nanocarbon particle dispersion composition can be produced by exchanging the solvent.

It is noted that, in the present specification, the surface-modified nanocarbon particles obtained by the production method described above and the surface-modified ND described above may be collectively referred to as "surface-modified nanocarbon particles (Y)".

The dispersion medium is a medium for dispersing the surface-modified nanocarbon particles, and examples of the dispersion medium include water, organic solvents, and ionic liquids. Among these, from the perspective of being excellent in dispersibility of the surface-modified nanocarbon particles (Y) in an organic solvent, the dispersion medium is preferably an organic solvent. As the dispersion medium, only one type or two or more types may be used.

Examples of the organic solvent mentioned above include aliphatic hydrocarbons, such as hexane, heptane, and octane (in particular, linear saturated aliphatic hydrocarbons); aromatic hydrocarbons, such as benzene, toluene, and xylene; alicyclic hydrocarbons, such as cyclohexane and methylcyclohexane; aprotic polar solvents, such as dimethylformamide (DMF), dimethylacetamide, N-methylpyrrolidone, and dimethyl sulfoxide; alcohols, such as methanol; halogenated hydrocarbons, such as chloroform, dichloromethane, dichloroethane, carbon tetrachloride, chlorobenzene, and trifluoromethylbenzene; chain or cyclic ethers, such as diethyl ether, diisopropyl ether, dimethoxyethane, tetrahydrofuran (THF), and dioxane; esters, such as ethyl acetate and butyl acetate; chain ketones, such as methyl ethyl ketone (MEK) and methyl isobutyl ketone; and nitriles such as acetonitrile. Among these, aromatic hydrocarbons are preferred in that they are particularly excellent in dispersibility of the surface-modified nanocarbon particles (Y), and toluene is particularly preferred.

A rate of content of the nanocarbon particles in the nanocarbon particle dispersion composition is not particularly limited, but is, for example, from 0.1 ppm by mass to 10 mass %.

The rate of content of the nanocarbon particles can be calculated from the absorbance at 350 nm. It is noted that in a case where the rate of content of the surface-modified nanocarbon particles is a low concentration (e.g., 2000 ppm by mass or less), a compound in which the nanocarbon particles are surface-modified by high-frequency inductively-coupled plasma emission spectroscopy (ICP emission spectroscopy) can be detected, and the rate of content can be determined on the basis of the detected amount.

The rate of content of the dispersion medium in the nanocarbon particle dispersion composition is, for example, from 90 to 99.9999 mass %. It is to be noted that the upper limit is 100 mass %.

The nanocarbon particle dispersion composition may include only the surface-modified nanocarbon particles (Y) and the dispersion medium, or may contain other components. Examples of other components include surfactants, thickeners, coupling agents, dispersants, rust inhibitors, corrosion inhibitors, freezing point depressants, anti-foaming agents, anti-wear additives, antiseptics, and colorants. The rate of content of the other components to the total amount of the nanocarbon particle dispersion composition is, for example, 30 mass % or less, preferably 20 mass % or less, more preferably 10 mass % or less, even more preferably 5 mass % or less, and particularly preferably 1 mass % or less. Accordingly, the rate of total content of the surface-modified nanocarbon particles (Y) and the dispersion medium to the total amount of the nanocarbon particle dispersion composition is, for example, 70 mass % or greater, preferably 80 mass % or greater, more preferably 90 mass % or greater, even more preferably 95 mass % or greater, and particularly preferably 99 mass % or greater.

The nanocarbon particle dispersion composition contains the surface-modified nanocarbon particles (Y) in a highly dispersed state. The average particle size (D50) of the nanocarbon particles in the nanocarbon particle dispersion composition is, for example, 100 nm or less, preferably 60 nm or less, more preferably 50 nm or less, and even more preferably 20 nm or less. The lower limit of the average dispersed particle size of the nanocarbon particles is, for example, 5 nm.

The nanocarbon particle dispersion composition has a haze value of preferably 5 or less, more preferably 3 or less, and even more preferably 1 or less. The nanocarbon particle dispersion composition is excellent in dispersibility of the surface-modified nanocarbon particles (Y), and thus a nanocarbon particle dispersion composition having the haze value mentioned above can be obtained. The haze value can be measured according to JIS K 7136.

The nanocarbon particle dispersion composition can be preferably used, for example, as an additive to composite materials for imparting the characteristics of fine nanocarbon particles (such as, for example, mechanical strength, high refractive index, thermal conductivity, insulating properties, antioxidation properties, crystallization promoting action, and dendrite suppressing action) to a resin or the like (such as, for example, photocurable resins and thermoplastic resins). In addition, a composition obtained by adding the nanocarbon particle dispersion composition to a resin can be preferably used as, for example, a functional hybrid material, a thermally functional (such as heat resistant, heat storing, thermo-electrically conductive, and heat insulating) material, a photonic material (such as an organic EL element, an LED, a liquid crystal display, and an optical disk), a bio/biocompatible material, a coating material, a film material (such as a hard coating film for a touch screen or various displays, and a thermal barrier film), a sheet material, a screen material (such as a transmission type transparent screen), a filler material (such as a filler for heat radiation or for improving a mechanical property), a heat resistant plastic substrate material (such as a substrate for a flexible display), and a material for a lithium ion battery. Furthermore, the nanocarbon particle dispersion composition can also be used for medical applications, and as a friction-reducing agent or a lubricant applied to a sliding part or the like of a mechanical component (such as an automobile or an aircraft).

Each aspect disclosed in the present specification can be combined with any other feature disclosed herein. The configurations, combinations thereof, and the like in each embodiment of the present invention are examples, and various configurational additions, omissions, substitutions, and other changes may be made as appropriate without departing from the spirit of the present invention. Furthermore, inventions according to the present invention are not limited by the embodiments or the following examples, but are limited only by the claims.

EXAMPLES

An embodiment of the present invention will be described in further detail below based on examples.

Example 1

Surface-modified ND particles and a dispersion composition were produced through the following processes.

Water in an aqueous dispersion of ND particles (ND particles having a median diameter of 6.0 nm) was distilled off using an evaporator, and the resulting product was vacuum dried at 100° C. for 8 hours to obtain a black dry powder. To the resulting dried powder (100 mg) were added 1 mL of toluene and 1.5 g of 6-bromohexanoyl chloride, and the mixture was reacted at 100° C. for 8 hours while being stirred. After completion of the reaction, the stirred mixture was centrifuged (classification operation) using a centrifuge. The centrifugal force in this centrifugation treatment was 20000×g, and the duration of the centrifugation was 10 minutes. Next, the powdered ND was recovered from the ND-containing solution that had been subjected to the centrifugation treatment, washed with methanol and acetone, and dried.

Next, 0.5 mL of toluene and 0.7 g of 1-octadecylamine were added to 0.04 g of the powdered ND, and the mixture was reacted at 100° C. for 8 hours while being stirred. After completion of the reaction, toluene was added thereto and diluted, and the diluted mixture was centrifuged (classification operation) using a centrifuge. The centrifugal force in this centrifugation treatment was 20000×g, and the duration of the centrifugation was 10 minutes. Next, 10 ml of supernatant of the ND-containing solution that had been subjected to this centrifugation treatment was collected. In this manner, a toluene dispersion composition of ND particles was obtained. The median diameter (particle size D50) of the obtained surface-modified ND particles was 23 nm, and the mass ratio [ND/surface-modifying group] determined by thermogravimetric analysis was 12.5.

Example 2

A toluene dispersion composition of ND particles was obtained in the same manner as in Example 1 with the exception that 1.2 g of 3-bromopropionyl chloride was used instead of 1.5 g of 6-bromohexanoyl chloride. The median diameter (particle size D50) of the obtained surface-modified ND particles was 27 nm, and the mass ratio [ND/surface-modifying group] determined by thermogravimetric analysis was 9.5.

Example 3

A toluene dispersion composition of ND particles was obtained in the same manner as in Example 2 with the exception that 0.7 g of oleylamine was used instead of 0.7 g of 1-octadecylamine. The median diameter (particle size D50) of the obtained surface-modified ND particles was 26 nm, and the mass ratio [ND/surface-modifying group] determined by thermogravimetric analysis was 8.0.

Example 4

A toluene dispersion composition of ND particles was obtained in the same manner as in Example 1 with the exception that 0.8 g of 1-octadecanol was used instead of 0.7 g of 1-octadecylamine. The median diameter (particle size D50) of the obtained surface-modified ND particles was 24 nm, and the mass ratio [ND/surface-modifying group] determined by thermogravimetric analysis was 14.1.

Example 5

Water in an aqueous dispersion of ND particles (ND particles having a median diameter of 6.0 nm) was distilled off using an evaporator, and the resulting product was vacuum dried at 100° C. for 8 hours to obtain a black dry powder. To the resulting dried powder (100 mg) were added 1 mL of toluene and 0.6 g of ethyl malonyl chloride, and the mixture was reacted at 100° C. for 8 hours while being stirred. After completion of the reaction, the stirred mixture was centrifuged (classification operation) using a centrifuge. The centrifugal force in this centrifugation treatment was 20000×g, and the duration of the centrifugation was 10 minutes. Next, the powdered ND was recovered from the ND-containing solution that had been subjected to the centrifugation treatment, washed with methanol and acetone, and dried.

Next, 1 mmol of 1-iododecane and 2 mmol of diazabicycloundecene were added to 0.02 g of the powdered ND in toluene, and the mixture was reacted at 50° C. for 8 hours while being stirred. After completion of the reaction, toluene was added thereto and diluted, and the diluted mixture was centrifuged (classification operation) using a centrifuge. The centrifugal force in this centrifugation treatment was 20000× g, and the duration of the centrifugation was 10 minutes. Next, 10 ml of supernatant of the ND-containing solution that had been subjected to this centrifugation treatment was collected. In this manner, a toluene dispersion composition of ND particles was obtained. The median diameter (particle size D50) of the obtained surface-modified ND particles was 29 nm, and the mass ratio [ND/surface-modifying group] determined by thermogravimetric analysis was 6.8.

Example 6

A toluene dispersion composition of ND particles was obtained in the same manner as in Example 5 with the exception that 1 mmol of 1-iodooctadecane was used instead of 1 mmol of 1-iodododecane. The median diameter (particle size D50) of the obtained surface-modified ND particles was 20 nm, and the mass ratio [ND/surface-modifying group] determined by thermogravimetric analysis was 6.6.
Particle Size D50
The median diameters (particle sizes D50) of the ND particles in the ND dispersion compositions obtained in the manners described above were volume-based values measured from the nanodiamond particle size distributions obtained by a dynamic light scattering method. Specifically, the nanodiamond particle size distributions were measured by a dynamic light scattering method (non-contact backscattering method) with the use of an instrument (trade name "Zetasizer Nano ZS") available from Malvern Panalytical Ltd.
Thermogravimetric Analysis
A sample (approximately 3 mg) was heated in an air atmosphere at a temperature rising rate of 20° C./minute using a TG/DTA (thermogravimetric-differential thermal analysis) device (trade name "EXSTAR6300", available from SII Technology), and the weight loss was measured. Alumina was used as the reference material.
<FT-IR Analysis>
The surface-modified nanodiamonds obtained in Examples 1, 4, and 5 were subjected to FT-IR measurement using a Fourier transform infrared spectrophotometer "IRTracer" (available from Shimadzu Corporation) equipped with a heating vacuum stirring reflex "Heat Chamber Type-1000° C." (available from ST Japan Inc.). It is noted that to remove adsorbed water of the ND particles, heating was performed at 150° C. for 10 minutes under a vacuum of $2 \times 10^{-3}$ Pa, and then the FT-IR measurement was performed.

Figure 2:
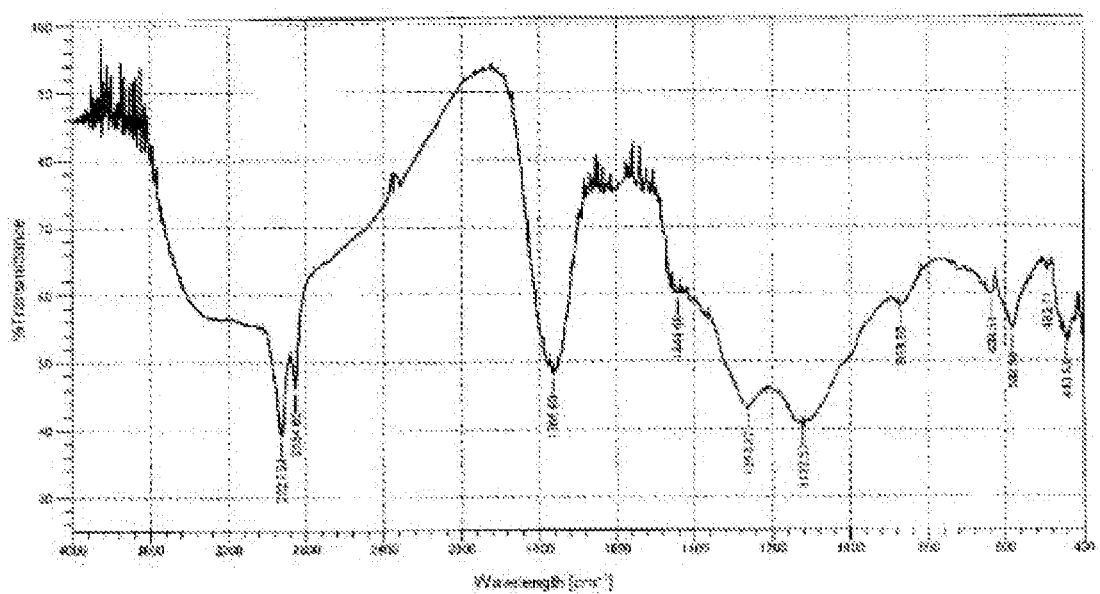
FIG. 2 is a figure showing an FT-IR spectrum of a surface-modified nanodiamond produced in Example 4.
Figure 3:
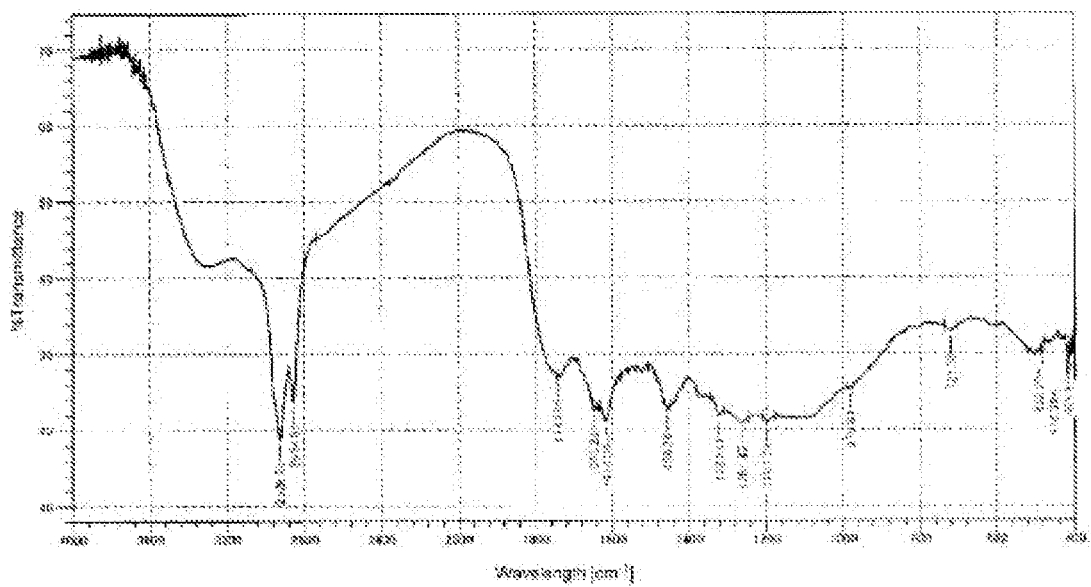
FIG. 3 is a figure showing an FT-IR spectrum of a surface-modified nanodiamond produced in Example 5.

The FT-IR spectra of the surface-modified nanodiamonds obtained in Examples 1, 4, and 5 are shown in FIGS. 1, 2, and 3, respectively. In Example 1, a peak derived from an amino group was confirmed near 3390 $cm^{-1}$, peaks derived from octadecyl groups were confirmed near 2926 $cm^{-1}$ and near 2855 $cm^{-1}$, and a peak derived from an ester bond was confirmed near 1759 $cm^{-1}$. In Example 4, peaks derived from octadecyl groups were confirmed near 2928 $cm^{-1}$ and near 2855 $cm^{-1}$, a peak derived from an ester bond was confirmed near 1767 $cm^{-1}$, and a peak derived from an ether bond was confirmed near 1123 $cm^{-1}$. In Example 5, peaks derived from a dodecyl group and an ethyl group were confirmed near 2926 $cm^{-1}$ and near 2855 $cm^{-1}$, and a peak derived from an ester bond was confirmed near 1744 $cm^{-1}$.

Variations of the invention according to the present invention will be described below.

[Appendix 1] A surface-modified nanodiamond including a nanodiamond particle and a group that surface-modifies the nanodiamond particle, the group being represented by Formula (1) or (2):

[Chem. 1]

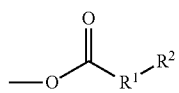

(1)

where in Formula (1), $R^1$ represents a substituted or unsubstituted divalent hydrocarbon group; and $R^2$ represents a leaving group or [—$X^1$—$R^3$], where $X^1$ represents —NH—, —$NR^3$—, —O—, —S—, or —O—(C=O)—, each $R^3$ is identical or different and represents a monovalent organic group, and an atom bonded to $X^1$ is a carbon atom;

[Chem. 2]

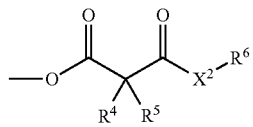

(2)

where in Formula (2), $R^4$ and $R^5$ are the same or different, and each represent a hydrogen atom or a monovalent organic group; $X^2$ represents a single bond or —O—; and $R^6$ represents an aliphatic hydrocarbon group.

[Appendix 2] The surface-modified nanodiamond according to Appendix 1, including a nanodiamond particle and a group that surface-modifies the nanodiamond particle, the group being represented by Formula (1), where in Formula (1), $R^1$ is a divalent aliphatic hydrocarbon group (preferably a linear or branched alkylene group, and more preferably a linear alkylene group).

[Appendix 3] The surface-modified nanodiamond according to Appendix 1 or 2, including a nanodiamond particle and a group that surface-modifies the nanodiamond particle, the group being represented by Formula (1), where in Formula (1), $R^1$ is a substituted or unsubstituted $C_{1-22}$ hydrocarbon group (preferably a substituted or unsubstituted $C_{2-10}$ hydrocarbon group, more preferably a substituted or unsubstituted $C_{3-8}$ hydrocarbon group).

[Appendix 4] The surface-modified nanodiamond according to any one of Appendices 1 to 3, including a nanodiamond particle and a group that surface-modifies the nanodiamond particle, the group being represented by Formula (1), where in Formula (1), $R^2$ is a leaving group (preferably a halogen atom, a sulfonyloxy group, or an acyloxy group, more preferably a halogen atom, and even more preferably a bromine atom).

[Appendix 5] The surface-modified nanodiamond according to any one of Appendices 1 to 3, including a nanodiamond particle and a group that surface-modifies the nanodiamond particle, the group being represented by Formula (1), where in Formula (1), $R^2$ represents [—$X^1$—$R^3$].

[Appendix 6] The surface-modified nanodiamond according to Appendix 5, wherein in Formula (1), $X^1$ is —NH—, —$NR^3$—, or —O— (preferably —NH— or —$NR^3$—).

[Appendix 7] The surface-modified nanodiamond according to Appendix 5 or 6, wherein in Formula (1), each $R^3$ is the same or different and is a monovalent organic group (preferably a monovalent substituted or unsubstituted hydrocarbon group, more preferably a monovalent substituted or unsubstituted hydrocarbon group having 10 or more (e.g., 10 to 22) carbon atoms, and even more preferably a monovalent substituted or unsubstituted hydrocarbon group having 15 or more (e.g., 15 to 20) carbon atoms).

[Appendix 8] The surface-modified nanodiamond according to any one of Appendices 5 to 7, wherein in Formula (1), the total number of carbon atoms (in particular, the number of carbon atoms constituting the hydrocarbon group) in $R^1$ and $R^3$ (in a case where $X^1$ represents —$NR^3$—, the total number of carbon atoms in $R^1$ and two $R^3$s) is 10 or more (preferably 15 or more, and more preferably 18 or more).

[Appendix 9] The surface-modified nanodiamond according to any one of Appendices 5 to 8, wherein in Formula (1), the total number of carbon atoms (in particular, the number of carbon atoms constituting the hydrocarbon group) in $R^1$ and $R^3$ (in a case where $X^1$ represents —$NR^3$—, the total number of carbon atoms in $R^1$ and two $R^3$s) is 30 or less (preferably 25 or less).

[Appendix 10] The surface-modified nanodiamond according to any one of Appendices 1 to 9, including a nanodiamond particle and a group that surface-modifies the nanodiamond particle, the group being represented by Formula (1), where in Formula (1), $R^1$ represents a substituted or unsubstituted $C_{2-10}$ divalent hydrocarbon group; $X^1$ is —NH—, —$NR^3$—, or —O—, where each $R^3$ is the same or different and represents a substituted or unsubstituted hydrocarbon group having 15 or more carbon atoms.

[Appendix 11] The surface-modified nanodiamond according to any one of Appendices 1 to 10, including a nanodiamond particle and a group that surface-modifies the nanodiamond particle, the group being represented by Formula (2), where in Formula (2), $R^4$ and $R^5$ are hydrogen atoms.

[Appendix 12] The surface-modified nanodiamond according to any one of Appendices 1 to 10, including a nanodiamond particle and a group that surface-modifies the nanodiamond particle, the group being represented by Formula (2), where in Formula (2), one of $R^4$ or $R^5$ is a hydrogen atom, and the other is a monovalent organic group (preferably a substituted or unsubstituted hydrocarbon group having 10 or more (e.g., 10 to 22) carbon atoms (preferably 15 or more (e.g., 15 to 20) carbon atoms)).

[Appendix 13] The surface-modified nanodiamond according to any one of Appendices 1 to 10, including a nanodiamond particle and a group that surface-modifies the nanodiamond particle, the group being represented by Formula (2), where in Formula (2), $R^4$ and $R^5$ are the same or different, and each are a monovalent organic group (preferably a substituted or unsubstituted hydrocarbon group having 10 or more (e.g., 10 to 22) carbon atoms (preferably 15 or more (e.g., 15 to 20) carbon atoms)).

[Appendix 14] The surface-modified nanodiamond according to any one of Appendices 1 to 13, including a nanodiamond particle and a group that surface-modifies the nanodiamond particle, the group being represented by Formula (2), where in Formula (2), $R^6$ is a linear or branched alkyl group.

[Appendix 15] The surface-modified nanodiamond according to any one of Appendices 1 to 14, including a nanodiamond particle and a group that surface-modifies the nanodiamond particle, the group being represented by Formula (2), where in Formula (2), $R^6$ is a $C_{1-4}$ aliphatic hydrocarbon group.

[Appendix 16] The surface-modified nanodiamond according to any one of Appendices 1 to 15, wherein a mass ratio of the nanodiamond particle to the group represented by Formula (1) or the group represented by Formula (2) in the surface-modified nanodiamond is 0.5 or greater (preferably 2.5 or greater).

[Appendix 17] The surface-modified nanodiamond according to any one of Appendices 1 to 16, wherein a mass ratio of the nanodiamond particle to the group represented by Formula (1) or the group represented by Formula (2) in the surface-modified nanodiamond is 15.0 or less (preferably 7.0 or less).

[Appendix 18] The surface-modified nanodiamond according to any one of Appendices 1 to 17, wherein a particle size (D50) is 400 nm or less (preferably 300 nm or less, more preferably 100 nm or less, and even more preferably 50 nm or less).

[Appendix 19] The surface-modified nanodiamond according to any one of Appendices 1 to 18, wherein the particle size (D50) is 5 nm or greater.

[Appendix 20] The surface-modified nanodiamond according to any one of Appendices 1 to 19, wherein a particle size (D90) is 500 nm or less (preferably 180 nm or less, and more preferably 170 nm or less).

[Appendix 21] The surface-modified nanodiamond according to any one of Appendices 1 to 20, wherein the particle size (D90) is 50 nm or greater.

[Appendix 22] A nanodiamond dispersion composition including: a dispersion medium; and the surface-modified nanodiamond described in any one of Appendices 1 to 21, the surface-modified nanodiamond being dispersed in the dispersion medium.

[Appendix 23] The nanodiamond dispersion composition according to Appendix 22, wherein the dispersion medium includes at least an organic solvent (preferably an aliphatic hydrocarbon, an aromatic hydrocarbon, an alicyclic hydrocarbon, an aprotic polar solvent, an alcohol, a halogenated hydrocarbon, a chain or cyclic ether, an ester, a chain ketone, or a nitrile, more preferably an aromatic hydrocarbon, and even more preferably toluene).

[Appendix 24] The nanodiamond dispersion composition according to any one of Appendix 22 or 23, wherein a rate of content of nanodiamond in the nanodiamond dispersion composition is from 0.1 mass ppm to 10 mass %.

[Appendix 25] The nanodiamond dispersion composition according to any one of Appendices 22 to 24, wherein a rate of content of the dispersion medium in the nanodiamond dispersion composition is from 90 to 99.9999 mass %.

[Appendix 26] The nanodiamond dispersion composition according to any one of Appendices 22 to 25, wherein a total rate of content of the surface-modified nanodiamond and the dispersion medium with respect to a total amount of the nanodiamond dispersion composition is 70 mass % or greater (preferably 80 mass % or greater, more preferably 90 mass % or greater, even more preferably 95 mass % or greater, and particularly preferably 99 mass % or greater).

[Appendix 27] The nanodiamond dispersion composition according to any one of Appendices 22 to 26, wherein the nanodiamond particle in the nanodiamond dispersion composition has an average dispersed particle size (D50) of 100 nm or less (preferably 60 nm or less, more preferably 50 nm or less, and even more preferably 20 nm or less).

[Appendix 28] The nanodiamond dispersion composition according to any one of Appendices 22 to 27, having a haze value of 5 or less (preferably 3 or less, and more preferably 1 or less).

[Appendix 29] A method of producing surface-modified nanocarbon particles, the method including a reaction step (A) of reacting a nanocarbon particle having a hydroxy group on its surface with a compound represented by Formula (3-1) to obtain surface-modified nanocarbon particles having a nanocarbon particle and a group that surface-modifies the nanocarbon particle, the group being represented by Formula (3-2):

[Chem. 3]

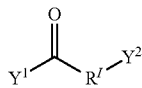
(3-1)

where in Formula (3-1), $R^I$ represents a substituted or unsubstituted divalent hydrocarbon group; $Y^1$ represents a halogen atom; and $Y^2$ represents a leaving group.

[Chem. 4]

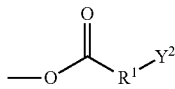
(3-2)

where in Formula (3-2), $R^I$ and $Y^2$ are each the same as described above.

[Appendix 30] The method of producing surface-modified nanocarbon particles according to Appendix 29, wherein in Formulas (3-1) and (3-2), $R^I$ is a divalent aliphatic hydrocarbon group (preferably a linear or branched alkylene group, and more preferably a linear alkylene group).

[Appendix 31] The method of producing surface-modified nanocarbon particles according to Appendix 29 or 30, wherein in Formulas (3-1) and (3-2), $R^I$ is a substituted or unsubstituted $C_{1-22}$ hydrocarbon group (preferably a substituted or unsubstituted $C_{2-10}$ hydrocarbon group, and more preferably a substituted or unsubstituted $C_{3-8}$ hydrocarbon group).

[Appendix 32] The method of producing surface-modified nanocarbon particles according to any one of Appendices 29 to 31, wherein in Formula (3-1), $Y^1$ is a chlorine atom.

[Appendix 33] The method of producing surface-modified nanocarbon particles according to any one of Appendices 29 to 32, wherein in Formula (3-1), $Y^2$ is a halogen atom (preferably a bromine atom).

[Appendix 34] The method of producing surface-modified nanocarbon particles according to any one of Appendices 29 to 33, wherein the reaction step (A) is performed in a state where the nanocarbon particle is dispersed in a dispersion medium (preferably an organic solvent, more preferably an organic solvent at least containing an aliphatic hydrocarbon, an aromatic hydrocarbon, an alicyclic hydrocarbon, an aprotic polar solvent, an alcohol, a halogenated hydrocarbon, a chain or cyclic ether, an ester, a chain ketone, or a nitrile, even more preferably an organic solvent containing an aromatic hydrocarbon, and particularly preferably an organic solvent containing toluene).

[Appendix 35] The method of producing surface-modified nanocarbon particles according to Appendix 34, wherein the reaction step (A) is performed in a dispersion composition in which the nanocarbon particle is nanodispersed in the dispersion medium.

[Appendix 36] The method of producing surface-modified nanocarbon particles according to Appendix 35, wherein the nanocarbon particle in the dispersion composition has a median diameter (D50) from 1 to 100 nm (preferably from 1 to 50 nm).

[Appendix 37] The method of producing surface-modified nanocarbon particles according to Appendix 35 or 36, wherein a concentration of the nanocarbon particle in the dispersion composition is from 1 to 10 mass %.

[Appendix 38] The method of producing surface-modified nanocarbon particles according to any one of Appendices 35 to 37, wherein a concentration of the compound represented by Formula (3-1) in the dispersion composition is from 1 to 60 mass %.

[Appendix 39] The method of producing surface-modified nanocarbon particles according to any one of Appendices 29 to 38, wherein a ratio of the nanocarbon particle to the compound represented by Formula (3-1) (former:latter, ratio by mass) supplied for the reaction step (A) is from 1:25 to 1:1.

[Appendix 40] A method of producing surface-modified nanocarbon particles, the method including a reaction step (B) of reacting a surface-modified nanocarbon particle having a nanocarbon particle and a group that surface-modifies the nanocarbon particle, the group being represented by Formula (3-2), with a compound represented by Formula (3-3) to obtain surface-modified nanocarbon particles having a nanocarbon particle and a group that surface-modifies the nanocarbon particle, the group being represented by Formula (3-4):

[Chem. 5]

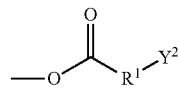
(3-2)

where in Formula (3-2), $R^I$ represents a substituted or unsubstituted divalent hydrocarbon group; and $Y^2$ represents a leaving group;

[Chem. 6]

$R^{II}—X^1—H$ (3-3)

where in Formula (3-3), $X^1$ represents —NH—, —NR$^3$—, —O—, —S—, or —O—(C=O)—; $R^3$ represents a monovalent organic group; $R^{II}$ represents a monovalent organic group; and an atom bonded to $X^1$ is a carbon atom;

[Chem. 7]

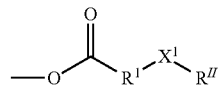
(3-4)

where in Formula (3-4), $R^I$, $X^1$, and $R^{II}$ are each the same as described above.

[Appendix 41] The method of producing surface-modified nanocarbon particles according to Appendix 40, wherein in Formulas (3-3) and (3-4), $X^1$ is —NH—, —NR$^3$—, or —O— (preferably —NH— or —NR$^3$—).

[Appendix 42] The method of producing surface-modified nanocarbon particles according to Appendix 40 or 41, wherein in Formulas (3-3) and (3-4), $R^{II}$ represents a substituted or unsubstituted hydrocarbon group having 10 or more (e.g., 10 to 22) carbon atoms (preferably 15 or more (e.g., 15 to 20)) carbon atoms.

[Appendix 43] The method of producing surface-modified nanocarbon particles according to any one of Appendices 40 to 42, wherein in Formula (3-4), the total number of carbon atoms (in particular, the number of carbon atoms constituting the hydrocarbon group) in $R^I$ and $R^{II}$ is 10 or more (preferably 15 or more, and more preferably 18 or more).

[Appendix 44] The method of producing surface-modified nanocarbon particles according to any one of Appendices 40 to 43, wherein in Formula (3-4), the total number of carbon atoms (in particular, the number of carbon atoms constituting the hydrocarbon group) in $R^I$ and $R^{II}$ is 30 or less (preferably 25 or less).

[Appendix 45] The method of producing surface-modified nanocarbon particles according to any one of Appendices 40 to 44, wherein the reaction step (B) is performed in a state where the surface-modified nanocarbon particle is dispersed in a dispersion medium (preferably an organic solvent, more preferably an organic solvent at least containing an aliphatic hydrocarbon, an aromatic hydrocarbon, an alicyclic hydrocarbon, an aprotic polar solvent, an alcohol, a halogenated hydrocarbon, a chain or cyclic ether, an ester, a chain ketone, or a nitrile, even more preferably an organic solvent containing an aromatic hydrocarbon, and particularly preferably an organic solvent containing toluene).

[Appendix 46] The method of producing surface-modified nanocarbon particles according to Appendix 45, wherein the reaction step (B) is performed in a dispersion composition in which the surface-modified nanocarbon particle is nanodispersed in the dispersion medium.

[Appendix 47] The method of producing surface-modified nanocarbon particles according to Appendix 46, wherein the surface-modified nanocarbon particle in the dispersion composition has a median diameter (D50) from 1 to 100 nm (preferably from 1 to 50 nm).

[Appendix 48] The method of producing surface-modified nanocarbon particles according to Appendix 46 or 47, wherein a concentration of the surface-modified nanocarbon particle in the dispersion composition is from 1 to 10 mass %.

[Appendix 49] The method of producing surface-modified nanocarbon particles according to any one of Appendices 46 to 48, wherein a concentration of the compound represented by Formula (3-3) in the dispersion composition is from 1 to 60 mass %.

[Appendix 50] The method of producing surface-modified nanocarbon particles according to any one of Appendices 40 to 49, wherein a ratio of the surface-modified nanocarbon particle to the compound represented by Formula (3-3) (former:latter, ratio by mass) supplied for the reaction step (B) is from 1:25 to 1:1.

[Appendix 51] A method of producing surface-modified nanocarbon particles, the method including a reaction step (C) of reacting a nanocarbon particle having a hydroxy group on its surface with a compound represented by Formula (4-1) to obtain surface-modified nanocarbon particles having a nanocarbon particle and a group that surface-modifies the nanocarbon particle, the group being represented by Formula (4-2):

[Chem. 8]

where in Formula (4-1), $X^2$ represents a single bond or —O—; $R^{III}$ represents an aliphatic hydrocarbon group; and $Y^3$ represents a halogen atom;

[Chem. 9]

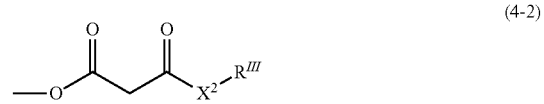

where in Formula (4-2), $X^2$ and $R^{III}$ are each the same as described above.

[Appendix 52] The method of producing surface-modified nanocarbon particles, according to Appendix 51, wherein in Formulas (4-1) and (4-2), $R^{III}$ is a linear or branched alkyl group.

[Appendix 53] The method of producing surface-modified nanocarbon particles according to Appendices 51 or 52, wherein in Formulas (4-1) and (4-2), $R^{III}$ is a $C_{1-4}$ aliphatic hydrocarbon group.

[Appendix 54] The method of producing surface-modified nanocarbon particles according to any one of Appendices 51 to 53, wherein in Formula (4-1), $Y^3$ is a chlorine atom.

[Appendix 55] The method of producing surface-modified nanocarbon particles according to any one of Appendices 51 to 54, wherein the reaction step (C) is performed in a state where the nanocarbon particle is dispersed in a dispersion medium (preferably an organic solvent, more preferably an organic solvent at least containing an aliphatic hydrocarbon, an aromatic hydrocarbon, an alicyclic hydrocarbon, an aprotic polar solvent, an alcohol, a halogenated hydrocarbon, a chain or cyclic ether, an ester, a chain ketone, or a nitrile, even more preferably an organic solvent containing an aromatic hydrocarbon, and particularly preferably an organic solvent containing toluene).

[Appendix 56] The method of producing surface-modified nanocarbon particles according to Appendix 55, wherein the reaction step (C) is performed in a dispersion composition in which the nanocarbon particle is nanodispersed in the dispersion medium.

[Appendix 57] The method of producing surface-modified nanocarbon particles according to Appendix 56, in which the nanocarbon particle in the dispersion composition has a median diameter (D50) from 1 to 100 nm (preferably from 1 to 50 nm).

[Appendix 58] The method of producing surface-modified nanocarbon particles according to Appendix 56 or 57, wherein a concentration of the nanocarbon particle in the dispersion composition is from 1 to 10 mass %.

[Appendix 59] The method of producing surface-modified nanocarbon particles according to any one of Appendices 56 to 58, wherein a concentration of the compound represented by Formula (4-1) in the dispersion composition is from 1 to 60 mass %.

[Appendix 60] The method of producing surface-modified nanocarbon particles according to any one of Appendices 51 to 59, wherein a ratio of the nanocarbon particle to the compound represented by Formula (4-1) (former:latter, ratio by mass) supplied for the reaction step (C) is from 1:25 to 1:1.

[Appendix 61] A method of producing surface-modified nanocarbon particles, the method including a reaction step (D) of reacting a surface-modified nanocarbon particle having a nanocarbon particle and a group that surface-modifies the nanocarbon particle, the group being represented by Formula (4-2), with a compound represented by Formula (4-3) to obtain surface-modified nanocarbon particles having a nanocarbon particle and a group that surface-modifies the nanocarbon particle, the group being represented by Formula (4-4):

[Chem. 10]

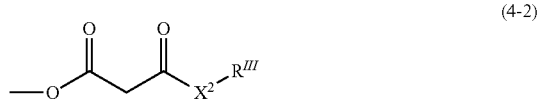
(4-2)

where in Formula (4-2), $X^2$ represents a single bond or —O—; and $R^{III}$ represents an aliphatic hydrocarbon group;

[Chem. 11]

(4-3)

where in Formula (4-3), $Y^4$ represents a halogen atom; $R^{IV}$ represents a monovalent organic group; and an atom bonded to $Y^4$ is a carbon atom;

[Chem. 12]

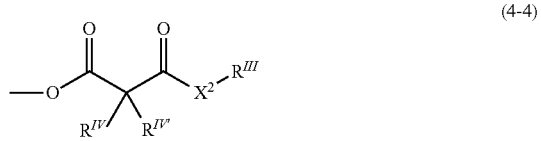
(4-4)

where in Formula (4-4), $X^2$, $R^{III}$, and $R^{IV}$ are each the same as described above, and $R^{IV'}$ represents a hydrogen atom or $R^{IV}$.

[Appendix 62] The method of producing surface-modified nanocarbon particles according to Appendix 61, wherein in Formulas (4-3) and (4-4), $R^{IV}$ is a monovalent substituted or unsubstituted hydrocarbon group (preferably a monovalent substituted or unsubstituted hydrocarbon group having 10 or more (e.g., 10 to 22) carbon atoms, and more preferably 15 or more (e.g., 15 to 20) carbon atoms).

[Appendix 63] The method of producing surface-modified nanocarbon particles according to Appendix 61 or 62, wherein in Formula (4-3), $Y^4$ is a bromine atom or an iodine atom.

[Appendix 64] The method of producing surface-modified nanocarbon particles according to any one of Appendices 61 to 63, wherein the reaction step (D) is performed in the presence of a basic catalyst (preferably an amine, a nitrogen-containing heterocyclic compound, an alkali metal alkoxide, an alkali metal carboxylate, an alkali metal hydroxide, an alkali metal carbonate, an alkali metal hydrogen carbonate, an alkaline earth metal hydroxide, an alkaline earth metal carbonate, an alkali metal hydride, or an alkali metal amide).

[Appendix 65] The method of producing surface-modified nanocarbon particles according to any one of Appendices 61 to 64, wherein the reaction step (D) is performed in a state where the surface-modified nanocarbon particle is dispersed in a dispersion medium (preferably an organic solvent, more preferably an organic solvent at least containing an aliphatic hydrocarbon, an aromatic hydrocarbon, an alicyclic hydrocarbon, an aprotic polar solvent, an alcohol, a halogenated hydrocarbon, a chain or cyclic ether, an ester, a chain ketone, or a nitrile, even more preferably an organic solvent containing an aromatic hydrocarbon, and particularly preferably an organic solvent containing toluene).

[Appendix 66] The method of producing surface-modified nanocarbon particles according to Appendix 65, wherein the reaction step (D) is performed in a dispersion composition in which the surface-modified nanocarbon particle is nanodispersed in the dispersion medium.

[Appendix 67] The method of producing surface-modified nanocarbon particles according to Appendix 66, wherein the surface-modified nanocarbon particle in the dispersion composition has a median diameter (D50) from 1 to 100 nm (preferably from 1 to 50 nm).

[Appendix 68] The method of producing surface-modified nanocarbon particles according to Appendix 66 or 67, wherein a concentration of the surface-modified nanocarbon particle in the dispersion composition is from 1 to 10 mass %.

[Appendix 69] The method of producing surface-modified nanocarbon particles according to any one of Appendices 66 to 68, wherein a concentration of the compound represented by Formula (4-3) in the dispersion composition is from 1 to 60 mass %.

[Appendix 70] The method of producing surface-modified nanocarbon particles according to any one of Appendices 61 to 69, wherein a ratio of the surface-modified nanocarbon particle to the compound represented by Formula (4-3) (former:latter, ratio by mass) supplied for the reaction step (D) is from 1:25 to 1:1.

[Appendix 71] The method of producing surface-modified nanocarbon particles according to any one of Appendices 29 to 69, wherein the nanocarbon particle includes a nanodiamond particle (preferably a nanodiamond particle obtained by a detonation method, and more preferably a nanodiamond particle obtained by an air-cooling detonation method).

The invention claimed is:

1. A surface-modified nanodiamond comprising a nanodiamond particle and a group that surface-modifies the nanodiamond particle, the group being represented by Formula (1) or (2):

(1)

wherein in Formula (1), $R^1$ represents a linear $C_{1-22}$ alkylene group, a substituted or unsubstituted alkenylene group, a substituted or unsubstituted alkynylene group, a substituted or unsubstituted alicyclic hydrocarbon group, a substituted or unsubstituted aromatic hydrocarbon group, or a group in which two or more of those listed above are bonded; and $R^2$ represents $[—X^1—R^3]$, wherein $X^1$ represents —NH—, —$NR^3$—, —O—, —S—, or —O—(C=O)—, each $R^3$ is the same or different and represents a substituted or unsubstituted hydrocarbon group having 15 or more carbon atoms, and an atom bonded to $X^1$ is a carbon atom;

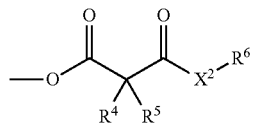

(2)

wherein in Formula (2), $R^4$ and $R^5$ are the same or different and each represent a hydrogen atom or a monovalent organic group; $X^2$ represents a single bond or —O—; and $R^6$ represents an aliphatic hydrocarbon group.

2. The surface-modified nanodiamond according to claim 1, comprising the nanodiamond particle and the group that surface-modifies the nanodiamond particle, the group being represented by Formula (1), wherein in Formula (1), $R^1$ represents a substituted or unsubstituted $C_{2-10}$ divalent hydrocarbon group; $X^1$ is —NH—, —$NR^3$—, or —O—.

3. The surface-modified nanodiamond according to claim 1, comprising the nanodiamond particle and the group that surface-modifies the nanodiamond particle, the group being represented by Formula (2), wherein in Formula (2), $R^4$ and $R^5$ are the same or different and each represent a substituted or unsubstituted hydrocarbon group having 10 or more hydrogen atoms or carbon atoms.

4. The surface-modified nanodiamond according to claim 1, wherein in Formula (1), the total number of carbon atoms in $R^1$ and $R^3$ is 30 or less, or when $X^1$ represents —$NR^3$—, the total number of carbon atoms in $R^1$ and two $R^3$s is 30 or less.

5. The surface-modified nanodiamond according to claim 1, including the nanodiamond particle and the group that surface-modifies the nanodiamond particle, the group being represented by Formula (2), wherein in Formula (2), $R^6$ is a linear or branched alkyl group.

6. The surface-modified nanodiamond according to claim 1, wherein a mass ratio of the nanodiamond particle to the group represented by Formula (1) or the group represented by Formula (2) in the surface-modified nanodiamond is 0.5 or greater.

7. The surface-modified nanodiamond according to claim 1, wherein a mass ratio of the nanodiamond particle to the group represented by Formula (1) or the group represented by Formula (2) in the surface-modified nanodiamond is 15.0 or less.

8. The surface-modified nanodiamond according to claim 1, wherein a particle size (D50) is 400 nm or less.

9. The surface-modified nanodiamond according to claim 1, wherein the particle size (D50) is 5 nm or greater.

10. A nanodiamond dispersion composition comprising:
a dispersion medium; and
the surface-modified nanodiamond described in claim 1, the surface-modified nanodiamond being dispersed in the dispersion medium.

11. A method of producing surface-modified nanocarbon particles according to claim 1, the method comprising reacting a nanocarbon particle having a hydroxy group on its surface with a compound represented by Formula (3-1) to obtain surface-modified nanocarbon particles having a nanocarbon particle and a group that surface-modifies the nanocarbon particle, the group being represented by Formula (3-2):

(3-1)

wherein in Formula (3-1), $R^I$ represents a linear $C_{1-22}$ alkylene group, a substituted or unsubstituted alkenylene group, a substituted or unsubstituted alkynylene group, a substituted or unsubstituted alicyclic hydrocarbon group, a substituted or unsubstituted aromatic hydrocarbon group, or a group in which two or more of those listed above are bonded; $Y^1$ represents a halogen atom; and $Y^2$ represents a leaving group;

(3-2)

wherein in Formula (3-2), $R^I$ and $Y^2$ are each the same as described above.

12. A method of producing surface-modified nanocarbon particles according to claim 1, the method comprising reacting a surface-modified nanocarbon particle having a nanocarbon particle and a group that surface-modifies the nanocarbon particle, the group being represented by Formula (3-2), with a compound represented by Formula (3-3) to obtain surface-modified nanocarbon particles having a nanocarbon particle and a group that surface-modifies the nanocarbon particle, the group being represented by Formula (3-4):

(3-2)

wherein in Formula (3-2), $R^I$ represents a linear $C_{1-22}$ alkylene group, a substituted or unsubstituted alkenylene group, a substituted or unsubstituted alkynylene group, a substituted or unsubstituted alicyclic hydrocarbon group, a substituted or unsubstituted aromatic hydrocarbon group, or a group in which two or more of those listed above are bonded and $Y^2$ represents a leaving group;

(3-3)

wherein in Formula (3-3), $X^1$ represents —NH—, —$NR^3$—, —O—, —S—, or —O—(C=O)—, where $R^3$ represents a substituted or unsubstituted hydrocarbon group having 15 or more carbon atoms; $R^{II}$ represents a substituted or unsubstituted hydrocarbon group having 15 or more carbon atoms; and an atom bonded to $X^1$ is a carbon atom;

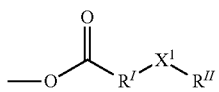
(3-4)

wherein in Formula (3-4), $R^I$, $X^1$, and $R^{II}$ are each the same as described above.

13. A method of producing surface-modified nanocarbon particles according to claim 1, the method comprising reacting a nanocarbon particle having a hydroxy group on its surface with a compound represented by Formula (4-1) to obtain surface-modified nanocarbon particles having a nanocarbon particle and a group that surface-modifies the nanocarbon particle, the group being represented by Formula (4-2):

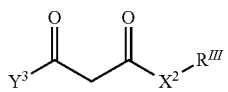
(4-1)

wherein in Formula (4-1), $X^2$ represents a single bond or —O—; $R^{III}$ represents an aliphatic hydrocarbon group; and $Y^3$ represents a halogen atom;

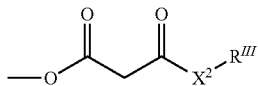
(4-2)

wherein in Formula (4-2), $X^2$ and $R^{III}$ are each the same as described above.

14. A method of producing surface-modified nanocarbon particles according to claim 1, the method comprising reacting a surface-modified nanocarbon particle having a nanocarbon particle and a group that surface-modifies the nanocarbon particle, the group being represented by Formula (4-2), with a compound represented by Formula (4-3) to obtain surface-modified nanocarbon particles having a nanocarbon particle and a group that surface-modifies the nanocarbon particle, the group being represented by Formula (4-4):

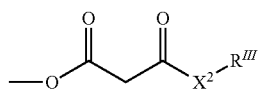
(4-2)

wherein in Formula (4-2), $X^2$ represents a single bond or —O—; and $R^{III}$ represents an aliphatic hydrocarbon group;

$$R^{IV}\!-\!Y^4 \quad (4\text{-}3)$$

wherein in Formula (4-3), $Y^4$ represents a halogen atom; $R^{IV}$ represents a monovalent organic group; and an atom bonded to $Y^4$ is a carbon atom;

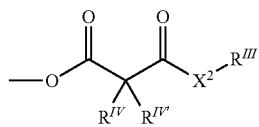
(4-4)

wherein in Formula (4-4), $X^2$, $R^{III}$, and $R^{IV}$ are each the same as described, and $R^{IV'}$ represents a hydrogen atom or $R^{IV}$.

15. A nanodiamond dispersion composition comprising:
a dispersion medium; and
the surface-modified nanodiamond described in claim 2, the surface-modified nanodiamond being dispersed in the dispersion medium.

16. A nanodiamond dispersion composition comprising:
a dispersion medium; and
the surface-modified nanodiamond described in claim 3, the surface-modified nanodiamond being dispersed in the dispersion medium.

17. A nanodiamond dispersion composition comprising:
a dispersion medium; and
the surface-modified nanodiamond described in claim 4, the surface-modified nanodiamond being dispersed in the dispersion medium.

18. A nanodiamond dispersion composition comprising:
a dispersion medium; and
the surface-modified nanodiamond described in claim 5, the surface-modified nanodiamond being dispersed in the dispersion medium.

* * * * *